United States Patent
Kukshya et al.

(10) Patent No.: US 8,280,111 B2
(45) Date of Patent: Oct. 2, 2012

(54) ADVANCED BACKGROUND ESTIMATION TECHNIQUE AND CIRCUIT FOR A HYPER-SPECTRAL TARGET DETECTION METHOD

(75) Inventors: Vikas Kukshya, Oak Park, CA (US); Jose M. Cruz-Albrecht, Oak Park, CA (US); Roy Matic, Newbury Park, CA (US); Peter Petre, Oak Park, CA (US); Mark W. Wolboldt, Monument, CO (US); David R. Gerwe, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 12/707,672

(22) Filed: Feb. 17, 2010

(65) Prior Publication Data
US 2011/0200225 A1      Aug. 18, 2011

(51) Int. Cl.
*G06K 9/00* (2006.01)
*G06K 9/62* (2006.01)
*G06K 9/40* (2006.01)

(52) U.S. Cl. .................. 382/103; 382/224; 382/260

(58) Field of Classification Search .................. 382/103, 382/104, 105, 133, 165, 170, 224, 225, 226, 382/227, 260–265
See application file for complete search history.

(56) References Cited

U.S. PATENT DOCUMENTS

| | | | |
|---|---|---|---|
| 7,515,084 B1 | 4/2009 | Cruz-Albrecht et al. | |
| 7,630,990 B2 * | 12/2009 | Hirata | 1/1 |
| 2005/0015418 A1 * | 1/2005 | Chang et al. | 708/232 |

OTHER PUBLICATIONS

A. Schaum. "Autonomous Hyperspectral Target Detection with Quasi-Stationarity Violation at Background Boundaries", I.E.E.E. 35th Applied Imagery and Pattern Recognition Workshop, 2006.*
Qian Du et al. "A Signal-Decomposed and Interference-Annihilated Approach to Hyperspectral Target Detection" Geoscience and Remote Sensing, IEEE Transactions on vol. 42, Issue: 4 Digital Object Identifier: 10.1109/TGRS.2003.821887 Publication Year: 2004, pp. 892-906.*
Chang "Target Signature-Constrained Mixed Pixel Classification for Hyperspectral Imagery" Geoscience and Remote Sensing, IEEE Transactions on vol. 40, Issue: 5 Digital Object Identifier: 10.1109/TGRS.2002.1010894 Publication Year: 2002, pp. 1065-1081.*
Chein-I Chang "Kalman Filtering Approach to Multispectral/Hyperstpectral Image Classification" I.E.E.E. Transactions on Aerospace and Electronic Systems vol. 35 No. 1 Jan. 1999, pp. 319-330.*

(Continued)

*Primary Examiner* — Brian Le
(74) *Attorney, Agent, or Firm* — Ameh IP; Lowell Campbell; Elahe Toosi

(57) ABSTRACT

A system, circuit and methods for target detection from hyper-spectral image data are disclosed. Filter coefficients are determined using a modified constrained energy minimization (CEM) method. The modified CEM method can operate on a circuit operable to perform constrained linear programming optimization. A filter comprising the filter coefficients is applied to a plurality of pixels of the hyper-spectral image data to form CEM values for the pixels, and one or more target pixels are identified from the CEM values. The process may be repeated to enhance target recognition by using filter coefficients determined by excluding the identified target pixels from the hyper-spectral image data.

34 Claims, 14 Drawing Sheets

OTHER PUBLICATIONS

Andrzej Cichocki and Rolf Unbehauen, "Neural Networks for Solving Systems of Linear Equations—Part II: Minimax and Least Absolute Value Problems", IEEE Transactions on Circuits and Systems, vol. 39, No. 9, Sep. 1992.

Andrzej Cichocki and Rolf Unbehauen, "Neural Networks for Solving Systems of Linear Equations and Related Problems"; IEEE Transactions on Circuits and Systems, vol. 39, No. 9, Feb. 1992.

Neural Networks for Optimization and Signal Processing by Andrzej Cichocki and Rolf Unbehauen, John Wiley and Sons, 1993.

Youshen Xia and Jun Wang, "A Recurrent Neural Networks for Solving Nonlinear Convex Programs Subject to Linear Constraints", IEEE Transactions on Neural Networks, vol. 16, No. 2, Mar. 2005.

Youshen Xia, "A New Neural Network for Solving Linear Programming Problems and Its Applications", IEEE Transactions on Neural Networks, vol. 7, No. 2, Mar. 1996.

Chein-I Chang, Jih-Ming Liu, Bin-Chang Chieu, Hsuan Ren, Chuin-Mu Wang, Chien-Shun Lo, Pau-Choo Chung, Ching-Wen Yang, and dye-Jyun Ma, "Generalized Constrained Energy Minimization approach to sub pixel target detection for multispecttral imagery", Optical Engineering, 39 (5), pp. 1275-1281, May 2000.

Smith M. et al: "A new approach to quantifying abundances of materials in multi spectral images", Geoscience and Remote Sensing Symposium, 1994. IGARSS '94. Surface and Atmospheric Remote Sensing: Technologies, Data Analysis and Interpretation, International Pasadena, CA, USA Aug. 8-12, 1994~New York, NY, USA,IEEE, US, vol. 4, Aug. 8, 1994, pp. 2372-2374, XPOI0138790, 001: DOI:IO.II09/IGARSS.1994.399741 ISBN: 978-0-7803-1497-9; p. 2372.

Farrand, W.: "Mapping the distribution of mine tailings in the Coeur d'Alene River Valley, Idaho, through the use of a constrained energy minimization technique", Remote Sensing of Environment, vo 1. 59, No. 1, Jan. 1, 1997, XP55002809, ISSN: 0034-4257, 001: 10.1016/S0034-4257(96)00080-6; pp. 64-76, Section: "Constrained energy minimization".

Boyd S et al: "Convex Optimization", Jan. 1, 2004, Cambridge, XP002650252, ISBN: 978-0-521-83378-3; pp. 291-305; Chapter 6.

Dimitris Manolakis, D.: "Taxonomy of detection algorithms for hyperspectral imaging applications", Optical Engineering, vol. 44, No. 6, Jan. 1, 2005, XP55002214, ISSN: 0091-3286, 001: 10.1117/1.1930927; p. 066403.

Chang C-I: "Orthogonal Subspace Projection (OSP) Revisited: A Comprehensive Study and Analysis", IEEE Transactions on Geoscience and Remote Sensing, IEEE Service Center, Piscataway, NJ, US, vol. 43, No. 3, Mar. 1, 2005, XP011127141, ISSN: 0196-2892, 001: OOI:I0.1109/TGRS.2004.839543; pp. 502-518, Section IV, IVA.

Weimin Liu et al: "A nested spatial window-based approach to target detection for hyperspectral imagery", Geoscience and Remote Sensing Symposium, 2004. IGARSS '04. Proceedings 2004 IEEE International Anchorage, AK, USA Sep. 20-24, 2004, Piscataway, NJ, USA,IEEE, vol. 1, Sep. 20, 2004, XPOI0751163, 001: DOI:I0.1109/IGARSS.2004.1369012 ISBN: 978-0-7803-8742-3; pp. 266-268.

Tian Han et al: "Hyperspectral end member detection and unmixing based on linear programming", Learning From Earth's Shapes and Sizes IGARSS 2003, 2003 IEEE International Geoscience and Remote Symposium , Centre De Congres Pierre Saudis, Toulouse, Franc, Jul. 21-25, 2003, Proceedings; IEEE International Geoscience and Remote Sensing Sym, vol. 3, Jul. 21, 2003, XP010703927, 001: DOI:I0.1109/IGARSS.2003.1294243 ISBN: 978-0-7803-7929-9; pp. 1763-1766.

Bajjouk: "Quantification of subpixel cover fractions using principal component analysis and a linear programming method: application to the coastal zone of Roscoff (France)", Remote Sensing of Environment, vo. 1, 64, No. 2, Jan. 1, 1998, XP55002228, ISSN: 0034-4257; p. 153, Section: "Methodology of Determination of Cover Type Proportions".

Hord: "Linear programming approach to unmixing hyperspectral image pixels [3240-10J", Proceedings of SPIE, Jan. 1, 1998, XP55002232, ISSN: 0277-786X; p. 69.

European Search Report, EP 11 15 4901, Jul. 29, 2011.

* cited by examiner

ADVANCED BACKGROUND ESTIMATION TECHNIQUE AND CIRCUIT FOR A HYPER-SPECTRAL TARGET DETECTION METHOD

BACKGROUND

Embodiments of the present disclosure relate generally to hyper-spectral imaging and detection, and more particularly relate to hyper-spectral target detection. Hyper-spectral imaging and detection is a type of spectral imaging and analysis that generally utilizes a wide, not-necessarily contiguous band of electromagnetic spectrum for imaging and/or detection of objects. Hyper-spectral remote sensing is used in a wide array of applications, for example, mining and geology where it can be used to look for oil and minerals. Hyper-spectral imaging is also used in fields as widespread as ecology and surveillance, airport security, as well as historical manuscript research such as for imaging ancient illegible texts. There are also automotive applications such as for collision avoidance. Hyper-spectral imaging technology is also relevant to various target detection applications, such as intelligence, surveillance, and reconnaissance (ISR) applications using unmanned aerial vehicles (UAVs).

A hyper-spectral imaging and detection system receives hyper-spectral image data from one or more sensors. The hyper-spectral image data generally contains hundreds to thousands of spectrum bands. Hyper-spectral sensors generally collect information as a set of images, where each image is a two-dimensional array of pixels. Each pixel measures and represents received energy in a range of the electromagnetic spectrum (spectral band). These images are then combined as planes to form a three-dimensional hyper-spectral cube where depth represents a pixel array plane for each spectral band.

Precision of the one or more sensors is typically measured in spectral resolution, where spectral resolution is a bandwidth of each band of the spectrum that is captured by the one or more sensors. If the hyper-spectral imaging and detection system receives a large number of fairly narrow frequency bands, it is possible to identify objects even if the objects are captured in a handful of pixels. However, spatial resolution is a factor in addition to spectral resolution. If a pixel receives spectra from too large a surface area, then multiple objects can be captured in the same pixel, which could make identifying a target more difficult. If the pixels are too small, then the energy captured by each sensor-cell is low, and the decreased signal-to-noise ratio reduces the reliability of measured features.

Various algorithms exist to identify target material from background and/or unknown material within a pixel. Generally, the algorithms require high speed, high dynamic-range analog to digital conversion (digitization) of analog signals upfront, followed by highly complex and computationally-intensive digital signal processing (DSP). Both digitization and DSP operations can be very power consuming. Existing algorithm implementations in hardware, such as conventional analog signal processing, may not be optimal due to performance limitations of, for example, analog circuits using scaled Complementary Metal-Oxide Semiconductor (CMOS) technologies. Conversely, traditional DSP approaches require high-speed sampling and a priori digitization, that may be limited by high power consumption and resulting low computational speed. Traditional hyper-spectral target detection algorithms, such as existing constrained energy minimization (CEM) algorithm implementations, may not be capable of real-time or near real time performance, especially onboard small power-restricted mobile platforms.

Thus, there is a need for hyper-spectral imaging and detection, circuits, detection algorithms, and background estimation techniques that are capable of real-time or near real-time performance.

SUMMARY

A system, circuit and methods for target detection from hyper-spectral image data are disclosed. Filter coefficients are determined using a modified constrained energy minimization (CEM) method. The modified CEM method can operate on a circuit operable to perform constrained linear programming optimization. A filter comprising the filter coefficients is applied to a plurality of pixels of the hyper-spectral image data to form CEM values for the pixels, and one or more target pixels are identified based on the CEM values. The process may be repeated to enhance target recognition by using filter coefficients determined by excluding the identified target pixels from the hyper-spectral image data.

A first embodiment comprises a method of target detection from hyper-spectral image data comprising a plurality of pixels comprising target spectra of target material and background spectra of background material. The method determines first filter coefficients by using circuit means to perform a constrained linear programming optimization based on the hyper-spectral image data, the target spectra, and an estimated background spectra. The method further applies a first filter comprising the first filter coefficients to the pixels to obtain first filtered pixels, and identifies first target pixels from the first filtered pixels.

A second embodiment comprises a system for target detection from hyper-spectral image data comprising a plurality of pixels. The system comprises a processor operable to perform constrained linear programming optimization and to execute a constrained energy minimization algorithm. The processor is operable to determine first filter coefficients using circuit means operable to perform the constrained linear programming optimization based on the hyper-spectral image data, the target spectra, and an estimated background spectra. The processor is further operable to apply a filter comprising the first filter coefficients to the pixels to obtain first filtered pixels, and identify first target pixels from the first filtered pixels.

A third embodiment comprises a method of target detection from hyper-spectral image data. The method identifies a plurality of pixels, each pixel comprises target spectra of target material and background spectra of background material, and calculates an average of spectra of the pixels to obtain a first background spectra. The method further performs a constrained energy minimization (CEM) optimization based on the hyper-spectral image data, the target spectra, and the first background spectra to obtain first filter coefficients. The method also estimates a CEM value for the pixels using the first filter coefficients.

A fourth embodiment comprises a circuit for hyper-spectral target detection. The circuit comprises control means operable to select target pixels from hyper-spectral image data, and filter means operable to compare a target hyper-spectral image data to the hyper-spectral image data. The circuit further comprises constrained linear programming optimization means operable to calculate filter coefficients from the hyper-spectral image data, the target spectra, and an estimated background spectra.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. As used herein, the term operable means "able to operate", and includes the capability of being put into use, operation, or practice.

BRIEF DESCRIPTION OF DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to hyper-spectral sensing, DSP, and other functional aspects of the systems (and the individual operating components of the systems) may not be described in detail herein. In addition, those skilled in the art will appreciate that embodiments of the present disclosure may be practiced in conjunction with remote sensing, target detection, and the like. Those skilled in the art will also appreciate that the system described herein is merely one example embodiment of the disclosure.

Embodiments of the disclosure are described herein in the context of a practical non-limiting application, namely, remote sensing. Embodiments of the disclosure, however, are not limited to such remote sensing applications, and the techniques described herein may also be utilized in other applications. For example, embodiments may be applicable to image analysis, collision avoidance, human body scanning for drugs and explosives at airports, luggage scanning, product defect scanning, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
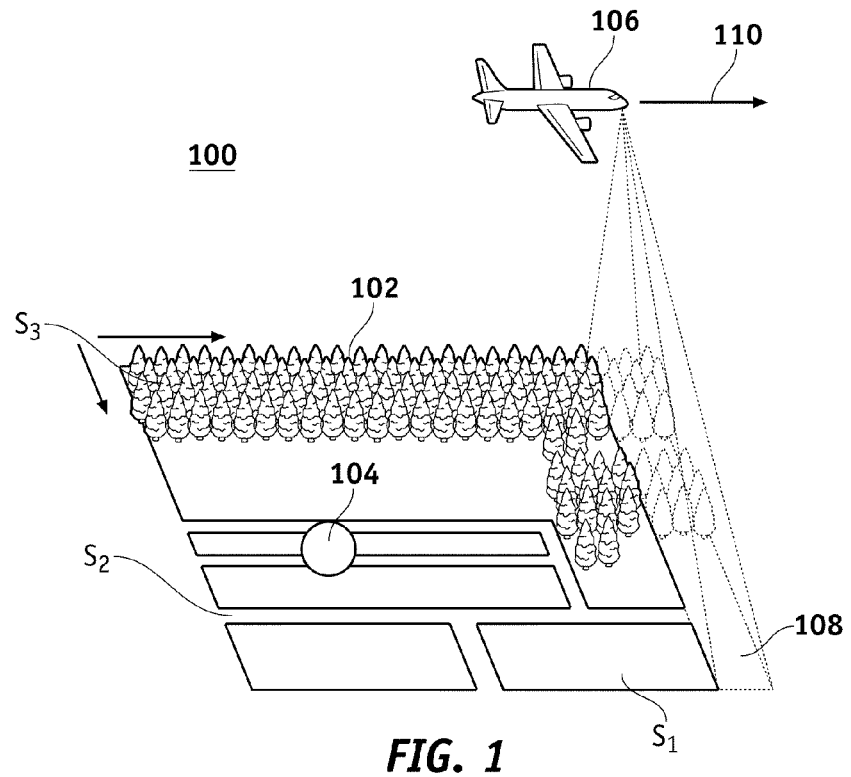
FIG. 1 is an illustration of an exemplary hyper-spectral imaging scenario according to an embodiment of the disclosure.

FIG. 1 is an illustration of a hyper-spectral imaging scenario 100 according to an embodiment of the disclosure. The hyper-spectral imaging scenario 100 comprises a scanned surface 102, a target 104, and an imaging platform 106. The imaging platform 106 such as an aircraft scans the scanned surface 102 to search for the target 104.

The scanned surface 102 comprises, for example but without limitation, a land surface comprising three different types of terrain materials $S_1$ such as plowed fields, $S_2$ such as roads, and $S_3$ such as trees. The plowed fields $S_1$, the roads $S_2$, and the trees $S_3$, each may have different spectral characteristics in hyper-spectral frequency bands. For example, the plowed fields $S_1$ may have high absorption at water absorption frequencies, the roads $S_2$ may have high abortion at tar and asphalt absorption frequencies, and the trees $S_3$ may have high absorption of visible light.

The target 104 may comprise, for example but without limitation, a metal object such a rifle. The rifle may be held by a soldier and hidden in foliage. Because the rifle is hidden in foliage, the rifle may be difficult to distinguish from a background such as the scanned surface 102 by visible imaging alone. However, the target 104, such as the rifle in this example, may have hyper-spectral spectra that are distinguishable from hyper-spectral spectra of the scanned surface 102.

The imaging platform 106 may comprise, for example but without limitation, a surveillance aircraft, a satellite, a balloon, a UAV, a ground vehicle, a boat or ship, mobile platform such as a hand held device, full body scanners at borders and ports, and the like. The imaging platform 106 comprises a hyper-spectral imaging device (not shown). The imaging platform 106 such as an aircraft can fly over the scanned surface 102 to search for the target 104 using the hyper-spectral imaging device. As the imaging platform 106 flies over the scanned surface 102, it scans a scanned strip 108 of the scanned surface 102. For example but without limitation, the scanned strip 108 may be about 1,000 meters in length substantially perpendicular to a direction of flight 110 and about 100 meters in width substantially parallel to the direction of flight 110. Depending on a speed and configuration of the imaging platform 106, the imaging platform 106 may scan the scanned strip 108 and subsequent strips, for example but without limitation, about 60 times a second (60 Hz) and the like. Strips such as the scanned strip 108 may or may not be consecutive in the direction of flight 110. So, the scanned strip 108 may be scanned non-contiguously.

Figure 2:
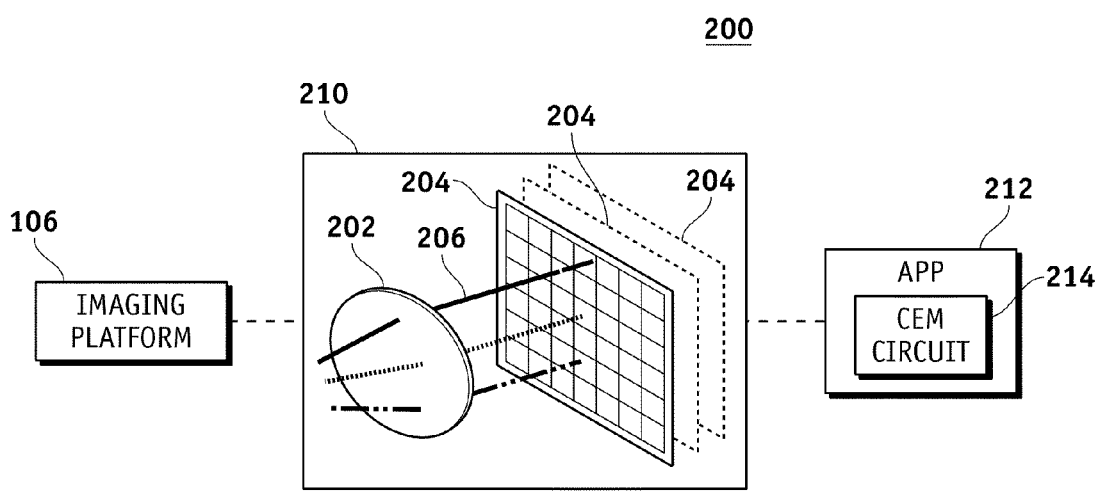
FIG. 2 is an illustration of an exemplary hyper-spectral imaging system according to an embodiment of the disclosure.

FIG. 2 is an illustration of an exemplary hyper-spectral imaging system 200 according to an embodiment of the disclosure. The exemplary hyper-spectral imaging system 200 comprises a sensor 210, and an Asynchronous Pulse Processor (APP) 212 comprising a CEM circuit 214. The sensor 210 may be coupled to the imaging platform 106 and comprises a lens system 202, and a focal plane array 204. The sensor 210 may be, for example but without limitation, a push-broom sensor, and the like.

The lens system 202 focuses a light stream 206 received from the scanned surface 102 (FIG. 1) onto the focal plane array 204 of the sensor 210, and divides the light stream 206 into a plurality of spectra. For example but without limitation, the lens system 202 may divide the light stream 206 into 210 imaged spectral bands, and the like.

The focal plane array 204 comprises an array of pixels and each pixel comprises sub-pixels for receiving the image spectral bands. For example but without limitation, the focal plane array 204 may comprise an array of pixels comprising nine spatial pixels each comprising sub-pixels for receiving the 210 imaged spectral bands. The 210 imaged spectral bands may partition a frequency spectrum from, for example but without limitation, about 500 nm to about 1100 nm, and the like. The nine spatial pixels image the scanned surface 102 as a line substantially perpendicular to a scanning direction as the imaging platform 106 scans over the scanned surface 102. In this manner, the focal plane array 204 yields a real valued matrix X of 9 pixel data vectors $x_i$ (i=1-9), where each of the pixel data vectors $x_i$ comprises 210 data values for each of the 210 imaged spectral bands ($\lambda_1, \ldots, \lambda_{210}$) for each time period. Hereinafter, each of the pixel data vectors $x_i$ (i=1-9) may be referred to as pixel spectra, hyper-spectra image data, or spectra of $i^{th}$ pixel interchangeably.

The APP 212 may be coupled to the sensor 210. The APP 212 may be a special purpose processor that can process linear programming optimization algorithms in real time or near real time. In this manner, a modified CEM algorithm can be mapped onto the CEM circuit 214 of the APP 212 for detection of the target 104 as explained in more detail below. The APP 212 is a continuous-time discrete-amplitude signal processor that can enable simple, high resolution, low power implementation of advanced algorithms such as a CEM algorithm modified as a standard linear programming optimization problem. The CEM circuit 214 of the APP 212 receives real time or near real-time hyper-spectral image data comprising the array of pixels from the focal plane arrays 204 of the sensor 210. The array of pixels generate pixel data vectors $x_i$ (i=1-9) comprising hyper-spectral image data. Output of the CEM circuit 214 of the APP 212 comprises, for example but without limitation, spectra t of target material of the target 104, relative abundance (CEM) values $y_i$ (equation (2) below) of the target 104 in each of the pixels, and the like. Processors other than a asynchronous pulse processor (APP 212) may also be used, such as but without limitation, a microprocessor, a digital signal processor, an analog signal processor, a mixed analog/digital processor, and the like.

Figure 3:
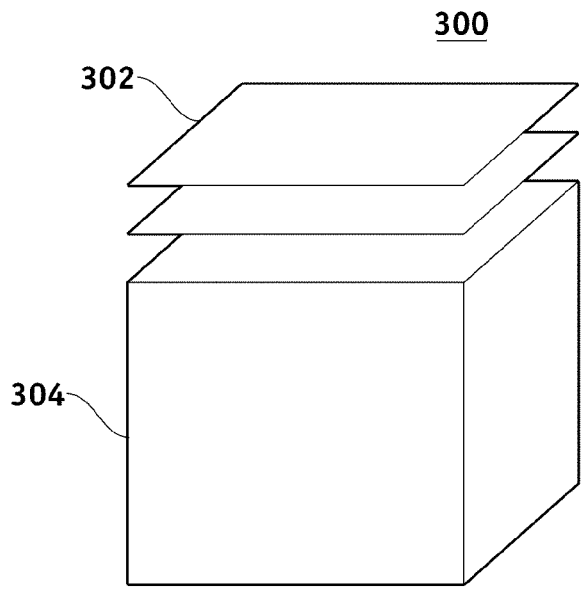
FIG. 3 is an illustration of an exemplary hyper-spectral image data cube according to an embodiment of the disclosure.

FIG. 3 is an illustration of an exemplary hyper-spectral image data cube 300 according to an embodiment of the disclosure. The hyper-spectral image data cube 300 comprises a plurality of hyper-spectral planes 302 that form a hyper-spectral image data cube 304. The hyper-spectral planes 302 are formed by the real valued matrix X, which comprises data from the scanned strip 108 (FIG. 1). The hyper-spectral image data cube 304 comprises data from a plurality of scanned strips such as the scanned strip 108 collected across the scanned surface 102.

In order to identify pixels comprising target material such as the target 104, a modified CEM algorithm is executed. The modified CEM algorithm creates a statistical description of background spectra from a given scene and then weights a comparison of the background spectra to target spectra in such a way so as to minimize effects of the background spectra that might be mixed into the hyper-spectra image data $x_i$ of a given scene. In this manner, the modified CEM algorithm finds pixels that comprise a specified target material and estimates an amount of the specified target material spectra in spectra of the pixels. As a first step, the modified CEM algorithm finds CEM filter coefficients w by optimizing the following relationship:

$$\min(w^T \bar{x}), \bar{x} = \frac{1}{p}\sum_{i=0}^{p} x_i \text{ and } \begin{cases} w^T * t = 1 \\ w^T * x_i \geq 0 \ i = 1, \ldots, p \end{cases} \quad (1)$$

where p is total number of pixels in a group under consideration; $x_i$ is a vector (size nb×1) comprising spectra of the $i^{th}$ pixel; nb is a number of imaged spectral bands $\lambda_i$ per each of the p pixels; $\bar{x}$ is a vector (size nb×1) comprising an averaged spectra (estimated background spectra) of the p pixels (or non-excluded pixels); t is a vector (size nb×1) comprising spectra (target spectra) of the target material; w is a CEM filter coefficients vector (size 1×nb), and T represents a vector transpose operation.

As a second step, the modified CEM algorithm filters the p pixels according to the following relationship:

$$y_i = \overline{w}^T \overline{x}_i, i=1, \ldots, p \quad (2)$$

where $y_i$ is a relative abundance of the target material in each of the p pixels, $\overline{w}$ is CEM filter coefficients vector (size nb×1), $\overline{x}_i$ is a vector (size nb×1) comprising a background estimate (radiance) of the $i^{th}$ pixel. For example, if $y_i$ is equal to 1, then the $i^{th}$ pixel comprises about 100% of the target material, if $y_i$ is equal to 0, then the $i^{th}$ pixel comprises about 0% of the target material, and if $y_i$ is equal to Z, then the $i^{th}$ pixel comprises about 100Z% of the target material.

For a given segment of the hyper-spectral image data $x_i$ of a total of p pixels, the estimated background spectra $\overline{x}$ is calculated by averaging the hyper-spectral image data $x_i$ of the pixels. The modified CEM algorithm then estimates the CEM filter coefficients w for a given segment of the hyper-spectral image data $x_i$ by minimizing a cost function, which is a product of the estimated background spectra $\overline{x}$ and the CEM filter coefficients vector w (CEM filter coefficients w). Two constraints that equation (1) should satisfy during the minimization process are: (1) a product of the target spectra t of the target material and the CEM filter coefficients w should be unity ($w^T * t = 1$), and (2) individual products of each of the p pixels and the CEM filter coefficients w should be greater than or equal to zero ($w^T * x_i \geq 0$).

Alternatively, in some embodiments, the individual products for constraint (2) ($w^T * x_i \geq 0$) for at least one pixel data vector $x_i$ and the CEM filter coefficients w may be allowed to be less than zero due to, for example but without limitation, calibration errors, noise, and the like. For example, if the modified CEM is used to detect gases (e.g., an environment protection application), $w^T * x_i$ can be negative when the gases appear to be in absorption mode (i.e., gas cooler than the background) versus emission mode (i.e., gas warmer than the background). When a target is in absorption mode, the target can be negatively correlated with a CEM filter.

The hyper-spectral image data cube 300 is an example to which the modified CEM algorithm can be applied to detect a target 104. In this example, one target material such as the target 104 and three unknown materials such as the terrain materials $S_1, S_2, S_3$ shown in FIG. 1 are present in the scene such as the scanned surface 102 shown in FIG. 1. Each pixel datum of the real valued matrix X (9 rows and 210 columns) may comprise a weighted sum of spectra of the four materials $S_1, S_2, S_3$, and the target material. Spectra of the three unknown materials such as the terrain materials $S_1, S_2, S_3$ shown in FIG. 1 may be unknown. In practice, random noise may mask the spectra of the four materials $S_1, S_2, S_3$, and the target material. In this example, a random noise is added to the 210 imaged spectral bands ($\lambda_1, \ldots, \lambda_{210}$) of the p=9 pixels resulting in a signal to noise ratio (SNR) of about 90 dB.

In order to improve accuracy, the estimated background spectra $\overline{x}$ may be calculated by excluding pixels determined to be target pixels. Pixels that are not excluded from a calculation of the estimated background spectra $\overline{x}$ are non-excluded pixels. The estimated background spectra $\overline{x}$ may be calculated based on the following relationship:

$$\overline{x} = \frac{1}{p} \sum_{i=0}^{p} x_i$$

where p is a total number of non-excluded pixels, $x_i$ is a vector comprising spectra of an $i^{th}$ non-excluded pixel, and $\overline{x}$ is a vector comprising an averaged spectra of the non-excluded pixels.

Figure 4:
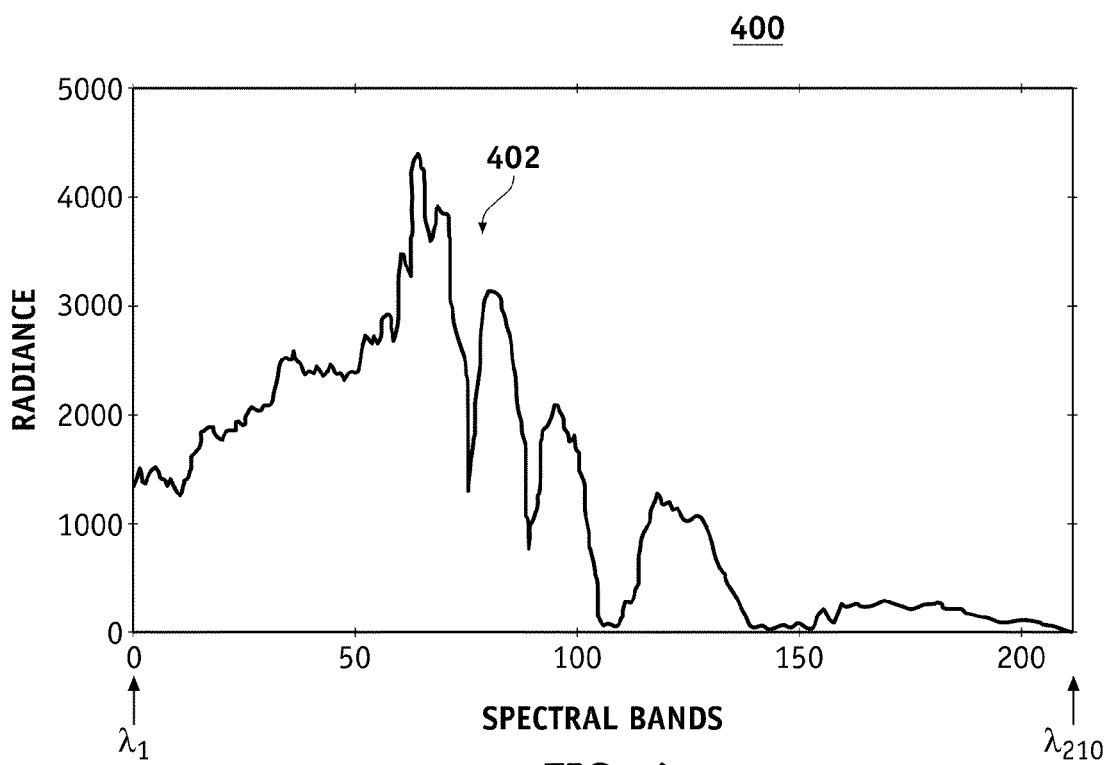
FIG. 4 is an illustration of exemplary hyper-spectral target spectra according to an embodiment of the disclosure.

FIG. 4 is an illustration of exemplary hyper-spectral target spectra 400 according to an embodiment of the disclosure. The hyper-spectral target spectra 400 corresponds to the target material and comprises radiance values 402 for each of the 210 imaged spectral bands ($\lambda_1, \ldots, \lambda_{210}$). The radiance values 402 represent received electromagnetic radiation, and may be derived from, for example but without limitation, direct empirical measurement, indirect empirical measurement, notional design, and the like. The hyper-spectral target spectra 400 are compared to the real valued matrix X for each scanned strip 108. The comparison may be through correlation, and the like, and the degree of correlation indicates a likelihood of presence of the target material in the pixel data vector $x_i$ of each of the p pixels.

Figure 5:
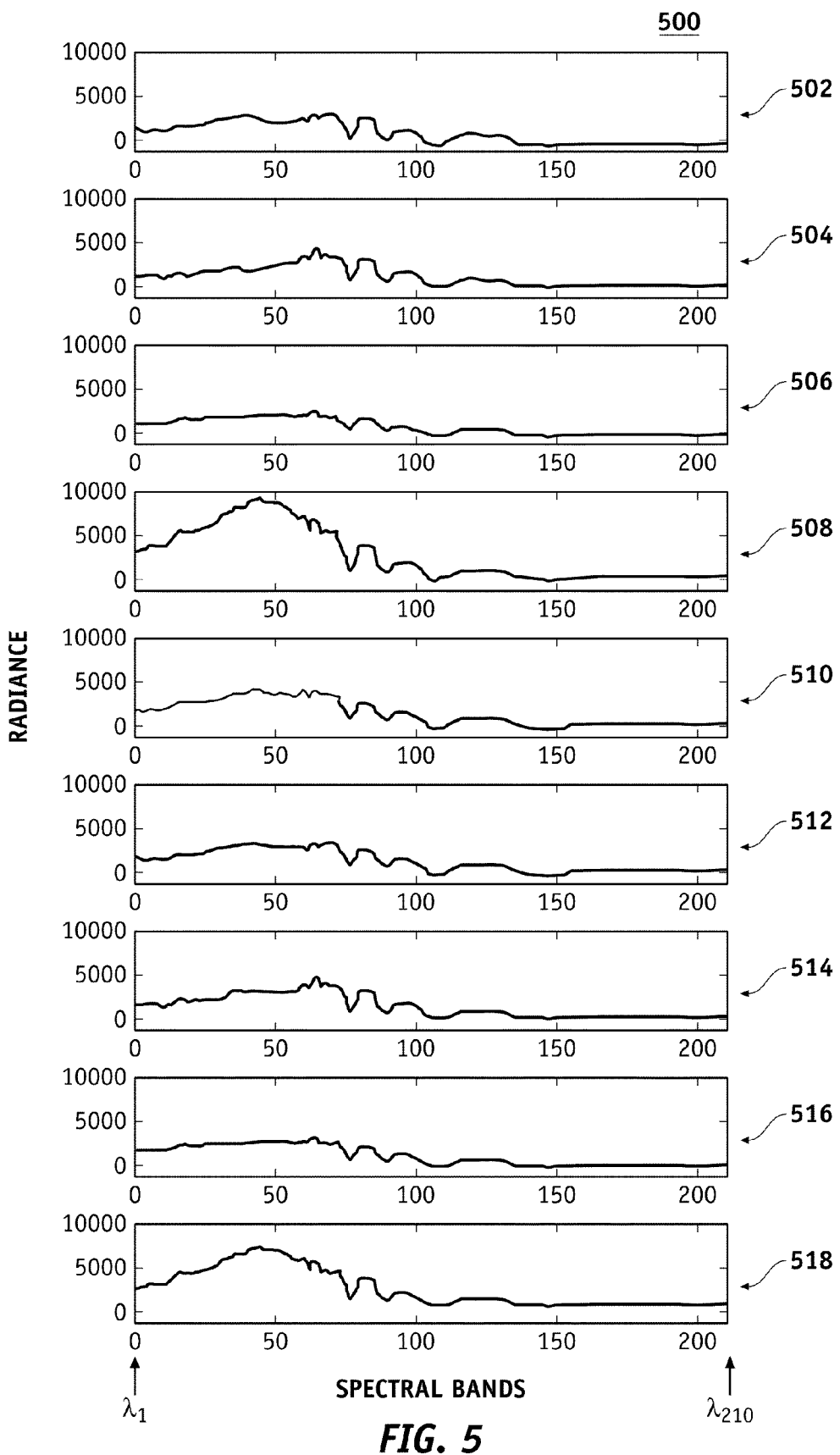
FIG. 5 is an illustration of exemplary hyper-spectral image data for each pixel of a real valued matrix according to an embodiment of the disclosure.

FIG. 5 is an illustration of exemplary hyper-spectral image data 500 showing graphs of hyper-spectral image data 502-518 for each of the p=nine pixels each having a pixel spectra $x_i$ of the real valued matrix X respectively according to an embodiment of the disclosure. Each graph of the hyper-spectral image data 502-518 corresponds to each of the nine pixel data vectors ($x_1, x_2, \ldots, x_9$). Each of the p=nine pixels comprises scanned radiance measurements for each of the 210 imaged spectral bands ($\lambda_1, \ldots, \lambda_{210}$) from the scanned strip 108. The hyper-spectral target spectra 400 (FIG. 4) is compared to the hyper-spectral image data 500 to determine presence or absence of the target material in the pixel data vector $x_i$ of each of the p pixels and thereby determine the presence or absence of the target 104.

Figure 6:
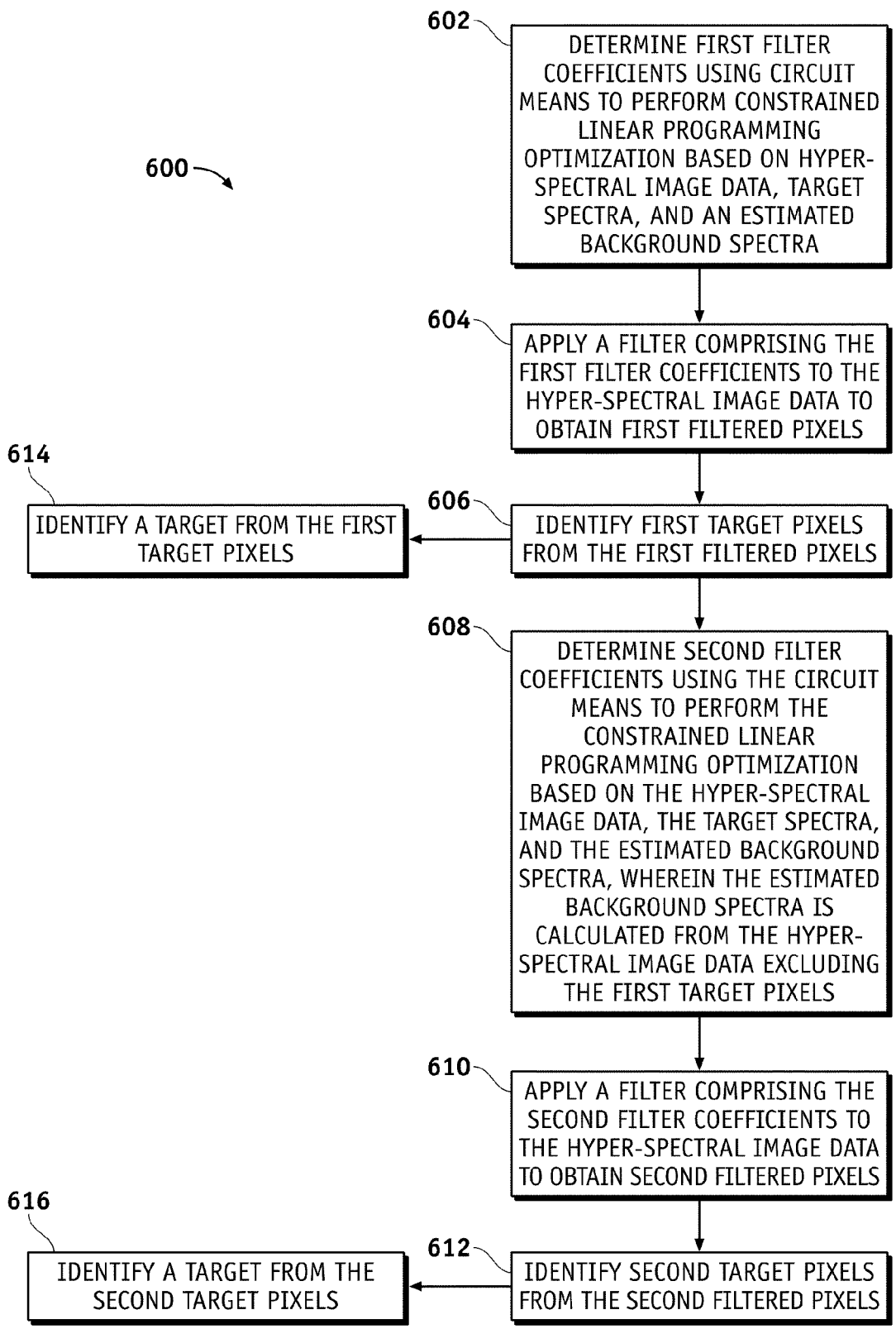
FIG. 6 is an illustration of a flow diagram showing an exemplary process for target detection from hyper-spectral image data according to an embodiment of the disclosure.

FIG. 6 is an illustration of a flow diagram showing an exemplary process 600 for target detection from hyper-spectral image data according to an embodiment of the disclosure. The various tasks performed in connection with the process 600 may be performed by software, hardware, firmware, or any combination thereof. For illustrative purposes, the following description of the process 600 may refer to elements mentioned below in connection with FIG. 7. In practical embodiments, portions of the process 600 may be performed by different elements described below in the context of discussion of circuit 700. Process 600 may have functions, material, and structures that are similar to the embodiments shown in FIGS. 1-5 and 7. Therefore common features, functions, and elements may not be redundantly described here.

Process 600 may begin by determining first filter coefficients using a modified CEM algorithm based on the hyper-spectra image data $x_i$, the target spectra t, and the estimated background spectra $\overline{x}$ (task 602). The first filter coefficients can be determined by using a circuit configured for constrained linear programming optimization based on the hyper-spectra image data $x_i$, the target spectra t, and the estimated background spectra $\overline{x}$. In this manner, the modified CEM algorithm can be mapped onto the special purpose APP 212 that can process linear programming optimization algorithms in real-time or near real-time. As explained in more detail below in the context of FIG. 7, dedicated circuits can be used to execute a substantially real time algorithm based on the modified CEM algorithm discussed in the context of FIG. 3 above. The modified CEM algorithm is formulated as a constrained linear programming optimization problem.

Process 600 may continue by applying a filter comprising the first filter coefficients to the hyper-spectra image data ($x_1, x_2, \ldots, x_9$) to obtain first filtered pixels (task 604). The modified CEM algorithm can detect target material even when the spectra t of the target material is known and the spectra of other materials are unknown.

Process 600 may continue by identifying first target pixels comprising the target material in their respective hyper-spectra image data $x_i$ from the first filtered pixels (task 606). In this manner, the CEM filter coefficients w are determined by applying the constrained linear programming optimization to determine unknown filter coefficients. Then, the CEM filter coefficients w are applied to the pixel data vectors (e.g., nine pixels $x_1, x_2, \ldots, x_9$ of the real valued matrix X, p=9 rows of $x_i$ and nb=210 columns of $\lambda_i$) to obtain CEM values for the first filtered pixels. A search is made through the CEM values for each of the nine pixels data vectors $(x_1, x_2, \ldots, x_9)$, and CEM values that reach a threshold are identified as first target pixels. However, to increase accuracy, the first target pixels may be removed from calculations of the estimated background spectra $\bar{x}$ to distinguish spectra t of the target material from spectra of unknown background materials $S_1, S_2, S_3$.

Process 600 may continue by identifying a target from the first target pixels (task 614). The target 104 and/or other targets can be identified based on the first target pixels.

Process 600 may continue by determining second filter coefficients using the modified CEM algorithm based on the hyper-spectra image data $x_i$, the target spectra t, and the estimated background spectra $\bar{x}$, where the estimated background spectra $\bar{x}$ is calculated from the hyper-spectra image data $x_i$ excluding hyper-spectra image data $x_i$ for the first target pixels (task 608). Task 608 repeats the task 604 with hyper-spectra image data $x_i$ for the first target pixels removed from the hyper-spectral image data $x_i$ for the estimated background spectra $\bar{x}$ estimation process. By removing the first target pixels that comprise the target material spectra t from the estimated background spectra $\bar{x}$ estimation process, the functional reliability as well as target detection and $y_i$ estimation performance of the modified CEM algorithm is significantly improved.

Process 600 may continue by applying a filter comprising the second filter coefficients to the hyper-spectra image data $x_i$ to obtain second filtered pixels (task 610). The modified CEM algorithm creates a statistical description of the estimated background spectra $\bar{x}$ of a given scene. The modified CEM algorithm then weights its comparison of the estimated background spectra to target spectra t of the first target pixels in such a way as to minimize effects of any estimated background spectra $\bar{x}$ that might be mixed into the hyper-spectral image data $x_i$. Pixels comprising a specified target material such as the target material of the target 104 are found and an amount (CEM value) of the specified target material in each of the pixels is estimated.

Process 600 may continue by identifying second target pixels from the second filtered pixels (task 612). To simplify and improve ability to implement the circuit design onto an APP platform such as the APP 212, it is necessary to be able to operate on smaller groups of about 30 pixels as well as 300 pixels, for example. In an embodiment, pixels that may comprise the target spectra t are quickly identified and removed from the estimated background spectra $\bar{x}$ estimation process so that the estimated background spectra $\bar{x}$ is uncorrupted by the target spectra t. In this manner, a search is made through CEM values for each of the nine pixels $(x_1, x_2, \ldots, x_9)$ of the real valued matrix X (size p=9×nb=210) and CEM values that reach a threshold are identified as second target pixels.

Process 600 may continue by identifying a target from the second target pixels (task 616). The target 104 and/or other targets are identified based on the first target pixels.

Process 600 and portions and tasks thereof may be repeated many times with potentially increasing accuracy with each iteration. For example, tasks 608 through 612 may be repeated using the second target pixels in place of the first target pixels and a third set of target pixels identified using the potentially improved background estimation excluding image data for the second target pixels.

Figure 7:
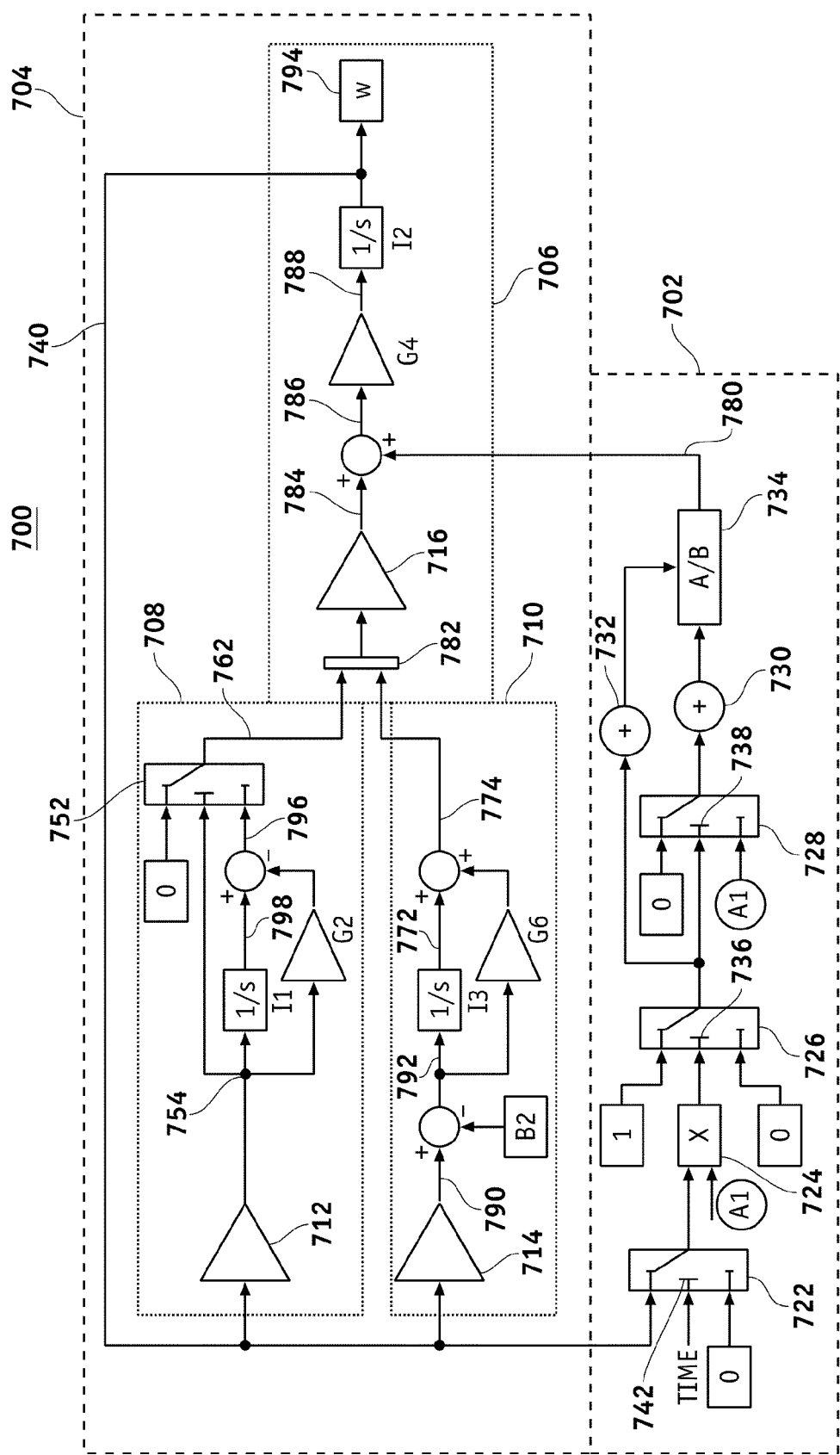
FIG. 7 is an illustration of a circuit implementation of a constrained energy minimization (CEM) algorithm for estimation of background spectra according to an embodiment of the disclosure.

FIG. 7 is an illustration of an exemplary circuit 700 for a modified CEM algorithm for estimation of an estimated background spectra $\bar{x}$ according to an embodiment of the disclosure. As explained above, conventional signal-processing approaches to advanced computationally intensive algorithms such as the CEM algorithm may not be optimal in hardware due to performance limitation of circuits in newer scaled CMOS technologies. Also, traditional digital signal-processing approaches may require high-speed sampling and digitization upfront, and may be limited by high power consumption and low computational speed. In contrast, the APP technology is a continuous-time, discrete-amplitude, asynchronous analog/digital signal-processing technology that can enable simple, high resolution, yet low-power implementation of advanced algorithms, including the ones that require real-time computations or operation. For ease of implementation onto the APP platform such as the APP 212, the modified CEM algorithm is formulated as a linear programming optimization problem in the circuit 700 of the APP 212.

The circuit 700 comprises a control circuit 702 and a CEM circuit 704 (CEM circuit 214 in FIG. 2). First, for a given segment of the hyper-spectral image data $x_i$ for a set of pixels, the estimated background spectra $\bar{x}$ is calculated by averaging the spectra $x_i$ of the pixels. The modified CEM algorithm then estimates the CEM filter coefficients w for the given segment of the hyper-spectral image data $x_i$.

The control circuit 702 comprises a first switch 722, a matrix product 724, a second switch 726, a third switch 728, a first summation 730, a second summation 732, and a division 734.

The first switch 722 loads filter coefficient values or zero values depending on a time value 742 on the control circuit 702. Time elapsed serves as a trigger for the first switch 722, if the time elapsed is greater than a pre-defined time threshold, an output of the first switch 722 is a current set of filter coefficient values (size nb×1), else the output of the first switch 722 is a zero vector (size nb×1).

The matrix product 724 comprises a vector of CEM values of the pixels (size p×1) comprising a product of a matrix A1 of the pixels (size p×nb) and the output of the first switch 722 (size nb×1).

The second switch 726 switches between outputting one or zero values depending on the CEM values on the second switch control input 736. The CEM values of the p pixels serve as the trigger for the second switch 726. If the CEM value of each of the p pixels is greater than a pre-defined abundance threshold value, thereby indicating that the pixel might contain the target spectra t, then a zero value is output by the second switch 726 for that pixel. In this manner, exclusion of the pixel comprising the target spectra t from the background spectra estimation process is signaled indicating an estimated background spectra is corrupted by the target spectra t. Otherwise, a unity value is output by the second switch 726.

The third switch 728 outputs zeros or a matrix of p pixel spectra $x=(x_1, x_2, \ldots, x_9)$ (size p×nb) depending on a result from the second switch 726 on the third switch control input 738. The output of the second switch 726 serves as a trigger for the third switch 728, if a value corresponding to a pixel data vector $x_i$ is unity, then that pixel data vector $x_i$ (size 1×nb) is relayed to the output of the third switch 728, otherwise if the pixel is flagged with a zero value, a zero vector (size 1×nb) is relayed to the output of the third switch 728.

The first summation 730 operates such that the values (size p×1) from the second switch 726 are summed to calculate a total number of un-flagged pixels that are not likely to comprise the target material.

The second summation 732 sums data from the third switch 728. The vectors (size p×nb) from the third switch 728 are summed (the pixels that are likely to comprise the target spectra t are replaced by a zero vector). The output vector (size 1×nb) is divided by a number of un-flagged pixels to calculate the un-corrupted background spectra.

The division 734 computes the un-corrupted estimated background spectra by dividing the output vector (size 1×nb) of the second summation 732 by the number of un-flagged pixels from the first summation 730. The un-corrupted estimated background spectra comprise the estimated background spectra (energy) computed as $\bar{x}$ in equation (1) above.

The CEM circuit 704 is operable to perform a feedback loop that calculates the minimum of equation (1). The CEM circuit 704 comprises a filter coefficient calculation circuit 706, a pixel-filter coefficient matrix product circuit 708, and a target-filter coefficient matrix product circuit 710.

The target-filter coefficient matrix product circuit 710 computes equation (2) for the target spectra t (size 1×nb) and an instantaneous CEM filter coefficients vector 740 (size 1×nb). The matrix product ($w^T*t$ in equation (1)) of the target spectra (t in equation (1)) and the instantaneous CEM filter coefficients vector 740 (w in equation (1)) is calculated by a multiplier 714 to obtain a CEM value result 790 (size 1×1). A value B2 (size 1×1) equal to about one is subtracted from the CEM value result 790 to obtain a differential CEM value 792 (size 1×1). The value B2 represents a CEM value for spectra of a pixel data vector $x_i$ comprising about 100% target spectra t. The differential CEM value 792 comprises a distance ($w^T*t-1$) from $w^T*t=1$ (equation (1)). An integrator 13 provides a low pass filter function of the differential CEM value 792 to reduce fluctuation in the feedback loop of the circuit 704.

A feedback loop penalty factor G6 is added to the integrator 13 output 772 to obtain the target-filter coefficient matrix product output 774 (size 1×1). The feedback loop penalty factor G6 may comprise a first penalty factor times the differential CEM value 792. The first penalty factor may depend, for example but without limitation, on a type of the hyperspectral image data $x_i$, on a rate of convergence of the instantaneous CEM filter coefficients vector 740, circuit characteristics, and the like. The first penalty factor may be, for example but without limitation, a constant value of about 1e3, a variable value between about 0 to about 1e5, and the like.

The pixel-filter coefficient matrix product circuit 708 computes equation (2) for the pixel data vector $x_i$ (size p×nb) and the instantaneous CEM filter coefficients vector 740 (size 1×nb). The matrix product ($w^T*x_i$ in equation (1)) of the pixel data vector $x_i$ and the instantaneous CEM filter coefficients vector 740 (w in equation (1)) is calculated by a multiplier 712 to obtain a CEM value result vector 754 (size 1×p). An integrator I1 provides a low pass filter function of the CEM value result 754 to reduce fluctuation in the feedback loop of circuit 704.

A feedback loop penalty factor G2 is added to the integrator I1 output 798 to obtain an adjusted integrator output 796 (size 1×p). The feedback loop penalty factor G2 may comprise a second penalty factor times the CEM value 754. The second penalty factor may depend, for example but without limitation, on a type of the hyper-spectral image data $x_i$, on the rate of convergence of the instantaneous CEM filter coefficients vector 740, circuit characteristics, and the like. The first penalty factor may be, for example but without limitation, a constant value of about 1e3, a variable value between about 0 to about 1e5, and the like.

The CEM value result 754 controls a switch bank 752, which sets a zero value or the adjusted integrator output vector 796 in each item of an output vector 762 (size 1×p) depending on the CEM value result 754 for the corresponding pixel data vector $x_i$. If the CEM value result 754 for the corresponding pixel data vector $x_i$ has a value greater than or equal to zero, the output vector 762 in the $i^{th}$ location is zero. If the CEM value result 754 for the corresponding pixel data vector $x_i$ has a value less than zero, the output vector 762 in the $i^{th}$ location is the $i^{th}$ location of the adjusted integrator output vector 796.

The filter coefficient calculation circuit 706 receives the output vector 762 (size 1×p) of the pixel-filter coefficient matrix product circuit 708 and the target-filter coefficient matrix product output 774 (size 1×1) and calculates instantaneous coefficient values 740 (size p×nb). The instantaneous coefficient values 740 are feedback into the pixel-filter coefficient matrix product circuit 708 and the target-filter coefficient matrix product circuit 710, and the calculation is repeated until it converges to the minimum of equation (1).

The output vector 762 of the pixel—filter coefficient matrix product circuit 708 and the target—filter coefficient matrix product output 774 are concatenated to form a single vector 782 (size 1×p+1). A multiplier 716 multiplies the single vector 782 by a matrix (size p+1×nb) of each of the pixel spectra $x_i$ and the target spectra t to obtain a result vector 784 (size 1×nb). The result vector 784 comprises a vector of the OEM values indicating a content of target material in each of the p pixels and in the target spectra t (i.e., a percentage of target material in the target spectra t should be about 100%, $w^T*t=1$). The result vector 784 is added to the estimated background spectra vector 780 (size 1×nb) to obtain an intermediate vector 786 (size 1×nb). The intermediate vector 786 is inverted by the inverter G4 to produce inverted vector 788 and integrated by the integrator 12 to reduce fluctuations to produce the instantaneous coefficient values 740 (size 1×nb). The filter coefficient register 794 holds the final filter coefficients w when the OEM circuit 704 converges.

The feedback loop of the CEM circuit 704 iterates until the output vector 762 converges to an all zero vector. After the CEM circuit 704 converges, the final filter coefficients 740 can be used to identify target pixels of the target spectra t of the target 104 according to equation (2). The CEM circuit 704 outputs pixel locations that exceed a specified threshold for a target material of interest. For example but without limitation, the specified threshold for the target material of interest may be about 0.2.

Figure 8:
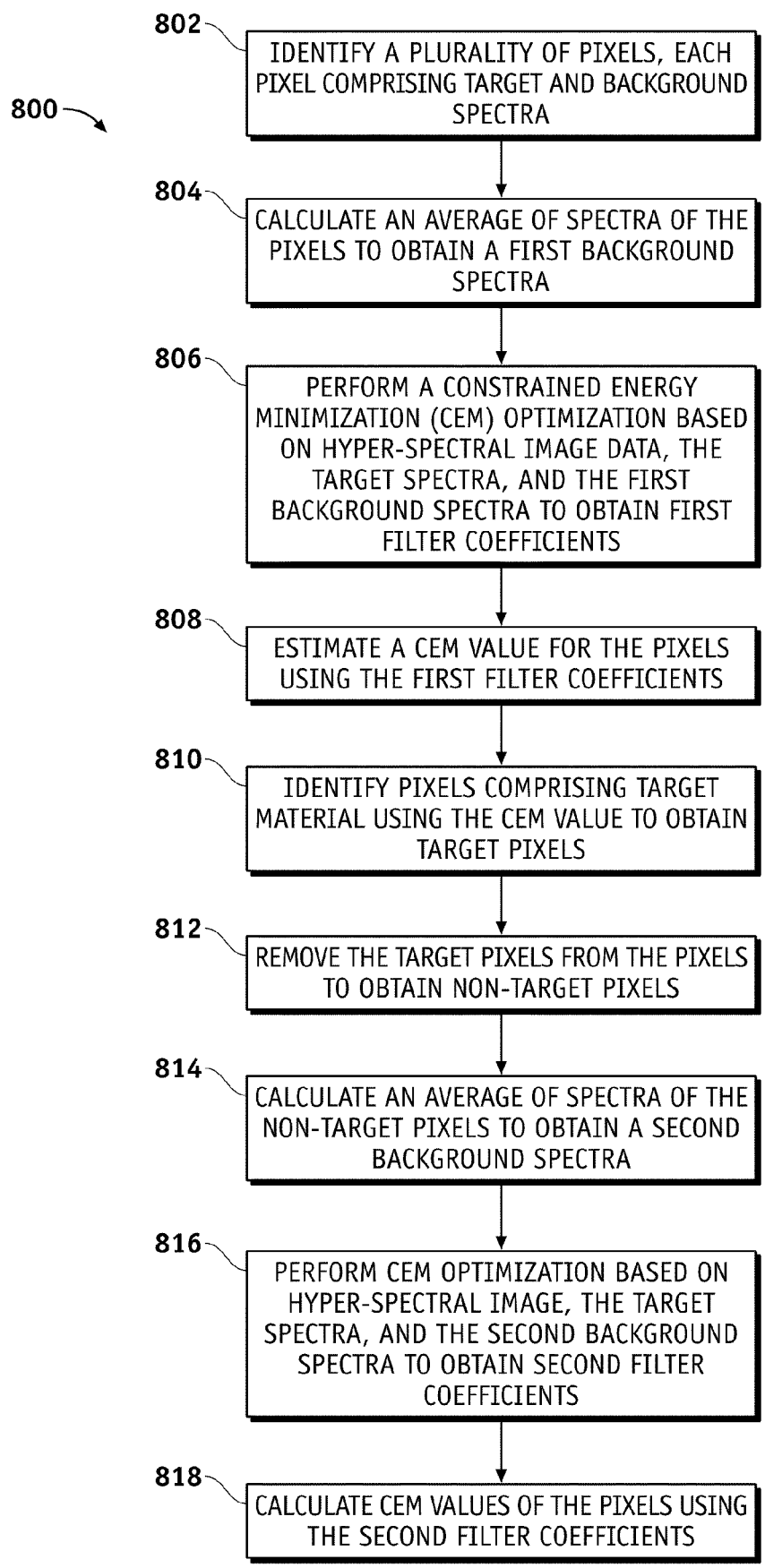
FIG. 8 is an illustration of a flow diagram showing an exemplary process for operation of the circuit of the FIG. 7 according to an embodiment of the disclosure.

FIG. 8 is an illustration of a flow diagram showing an exemplary process for operation of the circuit of the FIG. 7 according to an embodiment of the disclosure. The various tasks performed in connection with the process 800 may be performed by software, hardware, firmware, or any combination thereof. For illustrative purposes, the following description of the process 800 may refer to elements mentioned above in connection with FIG. 7. In practical embodiments, portions of the process 800 may be performed by different elements described below. Process 800 may have functions, material, and structures that are similar to the embodiments shown in FIG. 7. Therefore common features, functions, and elements may not be redundantly described here.

Process 800 may begin by identifying a plurality of pixel data vectors $x_i$ each comprising target spectra t for target material and spectra of the background material (task 802).

Process 800 may continue by calculating an average of spectra of the pixel data vectors $x_i$ to obtain a first background spectra (task 804). The estimated background spectra for the incoming group of the pixel data vectors $x_i$ are calculated by averaging the pixel data vectors $x_i$. This estimated background spectra $\bar{x}$ is used by the mathematical or the equivalent circuit model of the modified CEM algorithm to perform optimization. The filter coefficients w estimated by the modified CEM algorithm at the end of the optimization cycle are then used to estimate the CEM value of the pixel data vectors $x_i$.

Process 800 may continue by performing the CEM optimization on the first background spectra $\bar{x}$, (task 806). For example but without limitation, a linear programming circuit to obtain first filter coefficients, and the like may be used to perform the CEM optimization on the first background spectra $\bar{x}$.

Process 800 may continue by estimating a CEM value for the pixel data vectors $x_i$ using the first filter coefficients (task 808).

Process 800 may continue by identifying pixel data vectors $x_i$ comprising the spectra t of the target material using the CEM value to obtain identified pixels (task 810). The pixel data vectors $x_i$ that have the CEM value of greater than a predefined CEM threshold are flagged as pixel data vectors $x_i$ comprising the spectra t of the target material to obtain identified pixels. For example but without limitation, the CEM threshold may be set to between about 0 and about 1, e.g., about 0.5 indicating about 50% spectra of the target material and about 50% spectra of the background material. For a CEM threshold of about 0.5, a pixel that has a CEM value greater than about 0.5 (more target than background) could be flagged as comprising the spectra t of the target material.

Process 800 may continue by excluding the identified pixels from the pixels (pixel data vectors $x_i$) to obtain non-target pixels (task 812).

Process 800 may continue by calculating an average of spectra of the non-target pixels to obtain a second background spectra (task 814). In the next step, a second background spectra is calculated for the same incoming group of pixels (pixel data vectors $x_i$), but this time by averaging the spectral bands of the un-flagged pixels.

Process 800 may continue by performing the CEM optimization on the second background spectra (a new $\bar{x}$) to obtain second filter coefficients (task 816). For example but without limitation, a linear programming circuit to obtain first filter coefficients, and the like may be used to perform the CEM optimization on the second background spectra $\bar{x}$. The second background spectra $\bar{x}$ is then used by the mathematical or the equivalent circuit model of the algorithm to perform optimization of filter coefficient values to obtain optimized filter coefficients.

Process 800 may continue by calculating final CEM values of the pixel data vectors $x_i$ using the optimized filter coefficients (task 818). In this manner, the final CEM values of the pixels (pixel data vectors $x_i$) are calculated using a new set of filter coefficients.

Figure 9:
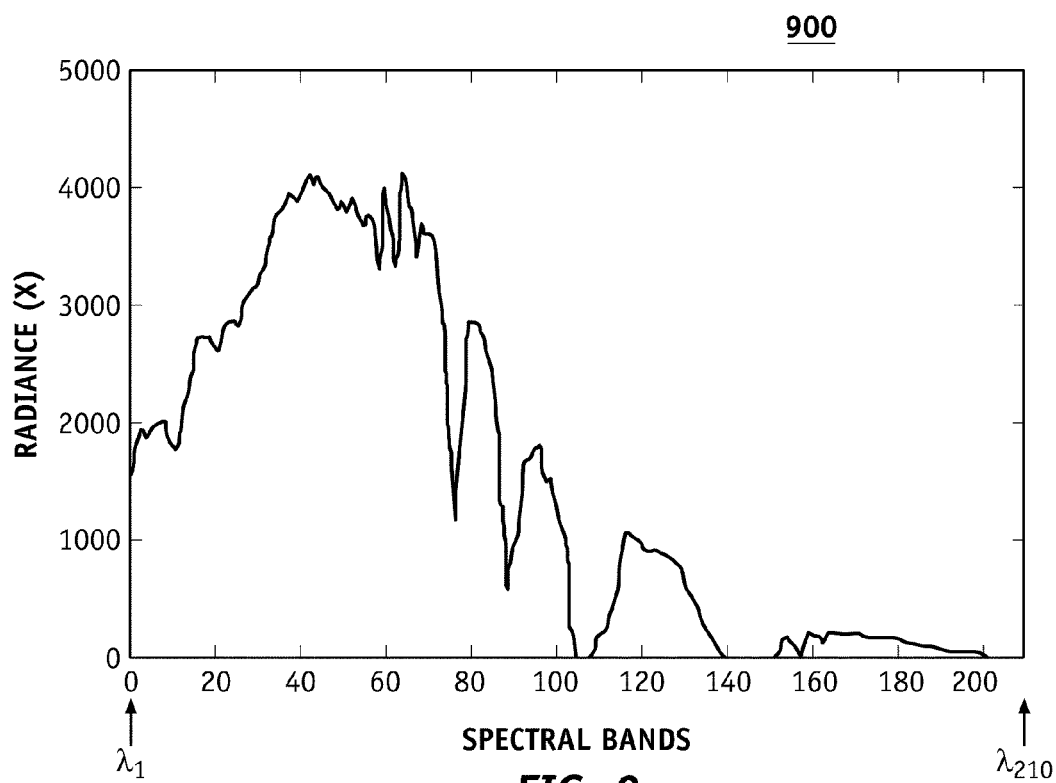
FIG. 9 is an illustration of a graph showing an exemplary determination of background spectra radiance according to an embodiment of the disclosure.
Figure 10:
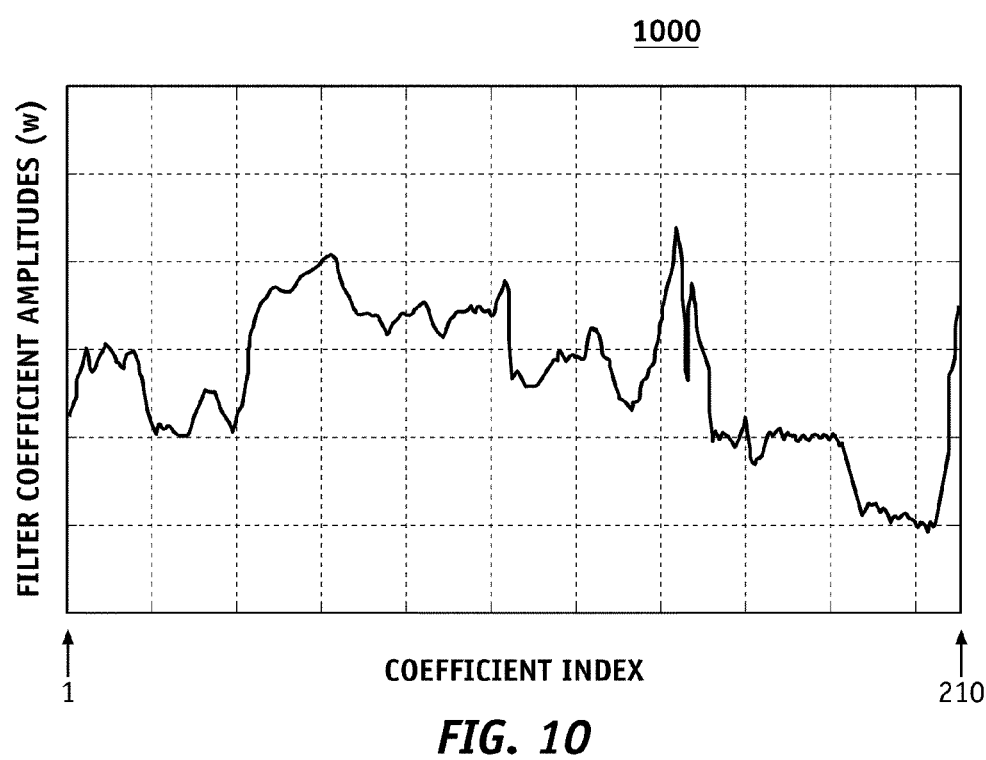
FIG. 10 is an illustration of a graph showing an exemplary determination of filter coefficients according to an embodiment of the disclosure.
Figure 11:
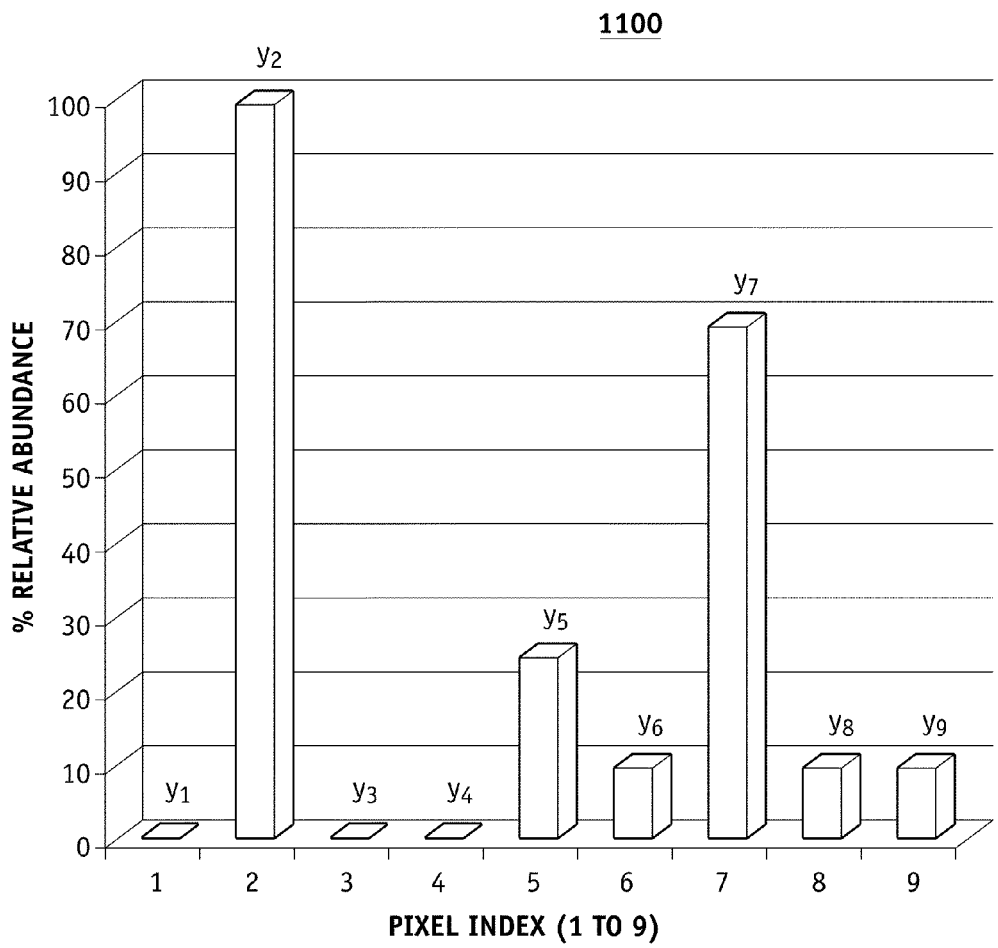
FIG. 11 is an illustration of a graph showing an exemplary degree of match of pixels to a target spectrum according to an embodiment of the disclosure.

FIGS. 9-11 show simulation result for the target detection process according to various embodiments of the disclosure.

FIG. 9 is an illustration of a graph showing an exemplary determination of radiance $\bar{x}$ (background spectra) according to an embodiment of the disclosure. The FIG. 9 shows a calculated average of spectra of the p pixels using equation (1).

FIG. 10 is an illustration of a graph showing an exemplary determination of filter coefficients according to an embodiment of the disclosure. The FIG. 10 shows the calculated CEM filter coefficients amplitudes w (CEM filter coefficients w). The calculated CEM filter coefficients amplitudes w are calculated from $x_i$, $\bar{x}$ and t by solving the constrained linear programming optimization problem and determining $\min(w^T \bar{x})$.

FIG. 11 is an illustration of a graph showing an exemplary degree of match of p=9 pixels to a target spectrum t according to an embodiment of the disclosure. The FIG. 11 shows the estimated relative abundance values of target material in each of the pixels. Calculated abundance values $y_i$ were identical with 82 dB SNR.

The modified OEM algorithm for target detection was tested on actual hyper-spectral image data xi and target spectra t collected using the Hyper-spectral Digital Imagery Collection Experiment (HYDICE) platform (ref: Su May Hsu et al, "Multisensor Function with Hyper-spectral Imaging Data: Detection and Classification," Lincoln Laboratory Journal, vol. 14, no. 1, 2003.

Figure 12:
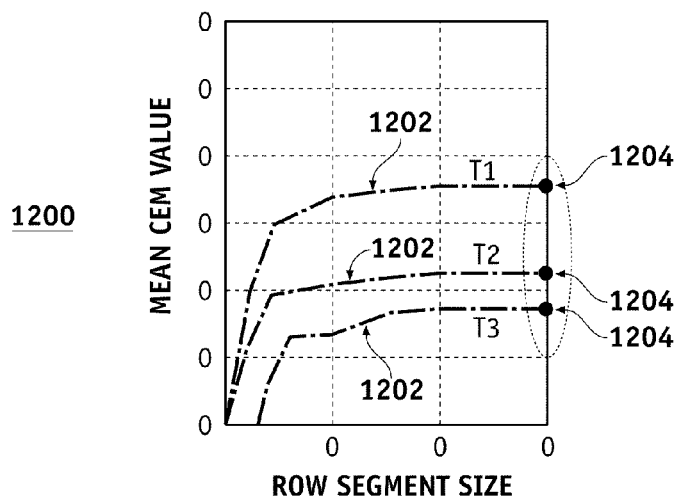
FIG. 12 is an illustration of a graph showing exemplary estimated relative abundance values of a target material for various numbers of pixels used for imaging according to an embodiment of the disclosure compared to a conventional algorithm.

FIG. 12 is an illustration of various graphs 1200 showing an exemplary estimated relative abundance value $y_i$ of target material of instances T1, T2, and T2 in target pixels of the target material for various numbers of pixels used in the modified CEM algorithm according to an embodiment of the disclosure compared to a representative hyper-spectral digital imagery collection experiment (HYDICE) data cube (conventional algorithm). A data cube with 960 rows of hyper-spectral image data, each row comprising about 300 pixels, and each pixel comprising reflectance information for 165 spectral bands was used. The modified OEM algorithm was operated on 20, 30, 50, and 150 pixels. As shown in FIG. 12 the modified OEM algorithm 1202 reliably detects all instances of the target material even when operating on just as few as 20 pixels and can also estimate material abundance values of pixels with acceptable accuracy. In contrast, the conventional algorithm 1204 (based on quadratic programming optimization) may operate on the entire data cube such as the data cube 300 in order to reliably detect the target material in the pixels p and accurately estimate corresponding material abundance values $y_i$. The test results show that not only can the modified OEM algorithm reliably detect the instances T1, T2, and T3 of the target material even when operating on as few as 20 pixels, but it can also estimate the relative abundance values $y_i$ of the target material in the pixels with acceptable accuracy.

Figure 13:
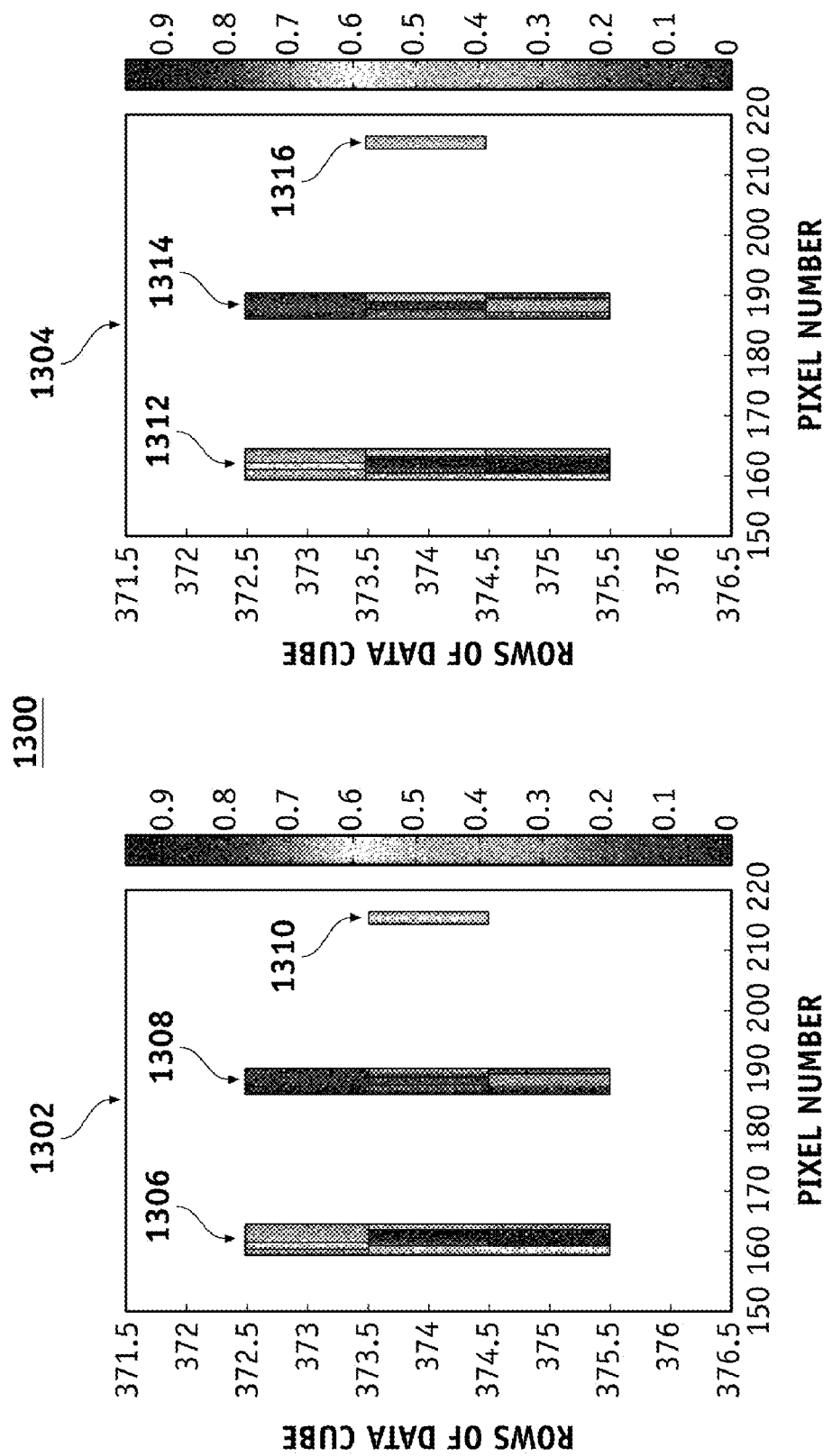
FIG. 13 is an illustration of graphs showing an exemplary target detection performance for 300 pixels according to an embodiment of the disclosure.

FIG. 13 is an illustration of graphs 1300 showing an exemplary target detection performance for 300 pixels according to an embodiment of the disclosure. In order to quantify performance of the modified OEM algorithm for target detection, the modified OEM algorithm was tested on actual hyper-spectral image data and target spectra that were collected using the Hyper-spectral Digital Imagery Collection Experiment (HYDICE) platform. The test results for a particular target material present in the given hyper-spectral image data are shown in FIG. 13. Image 1302 shows the modified OEM algorithm test results on target detection performance bars 1306, 1308 and 1310 for 3×3, 2×2, and 1×1 instances of a particular target material respectively using 300 pixels. Image 1304 shows ground truth reference target detection performance bars 1312, 1314, 1316 for 3×3, 2×2, and 1×1 instances of a particular target material respectively. The modified OEM algorithm test results shown in the image 1302 is substantially similar to the ground truth reference shown in the image 1304.

Figure 14:
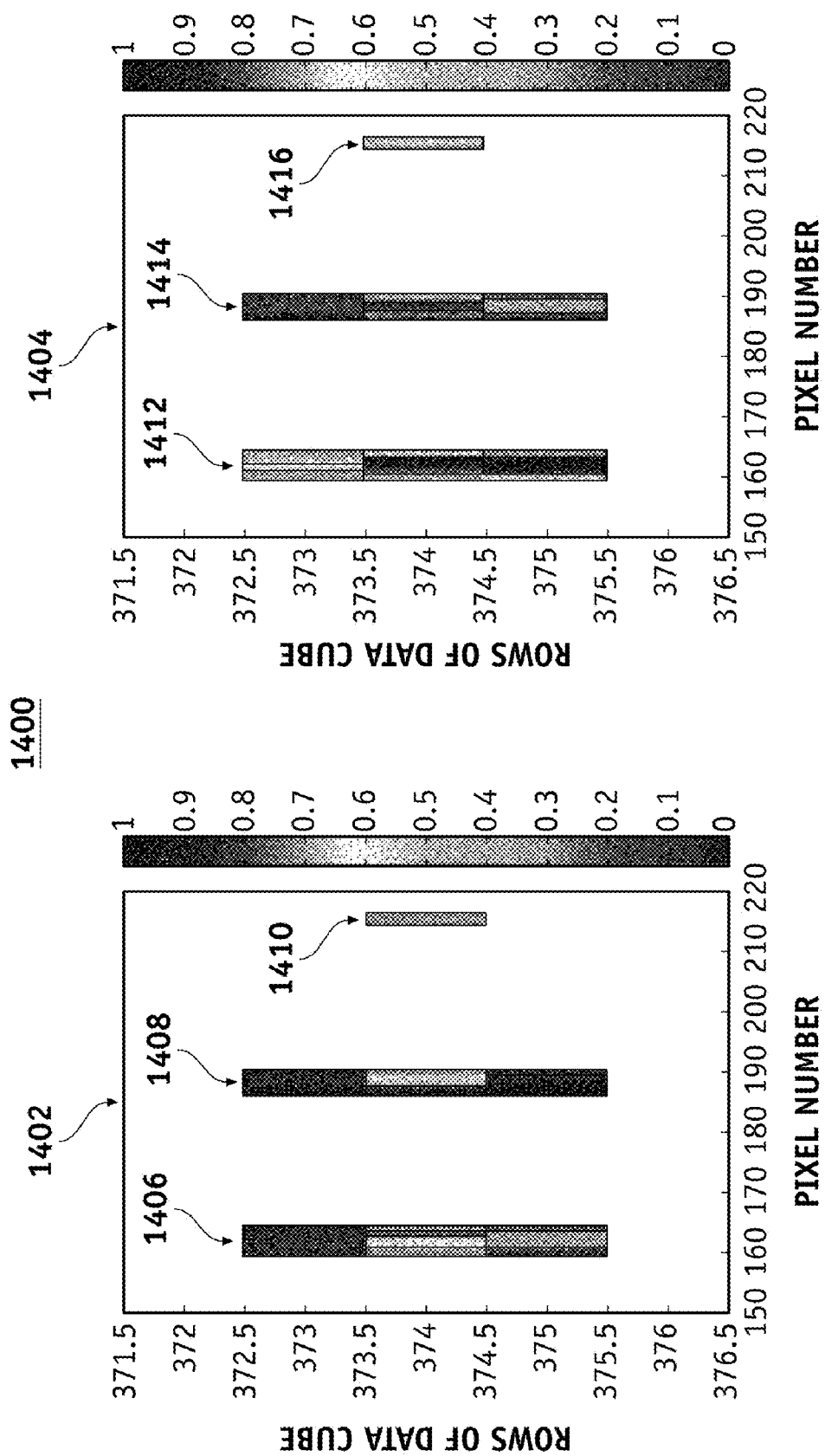
FIG. 14 is an illustration of graphs showing an exemplary target detection performance for 30 pixels according to an embodiment of the disclosure.

FIG. 14 is an illustration of graphs 1400 showing an exemplary target detection performance for 30 pixels using the modified OEM algorithm according to an embodiment of the disclosure. In order to test the performance limits of the modified OEM algorithm of the present embodiment, the modified OEM algorithm was tested on smaller pixel groups of 30 pixels. Image 1402 shows the modified OEM algorithm test results on target detection performance bars 1406, 1408 and 1410 for 3×3, 2×2, and 1×1 instances of a particular target material respectively using 30 pixels. Image 1404 shows ground truth reference target detection performance bars 1412, 1414, 1416 for 3×3, 2×2, 1×1 instances of the particular target material respectively. The modified OEM algorithm test results shown in the image 1402 shows acceptable accuracy even when using 30 pixels in the modified OEM algorithm.

Figure 15:
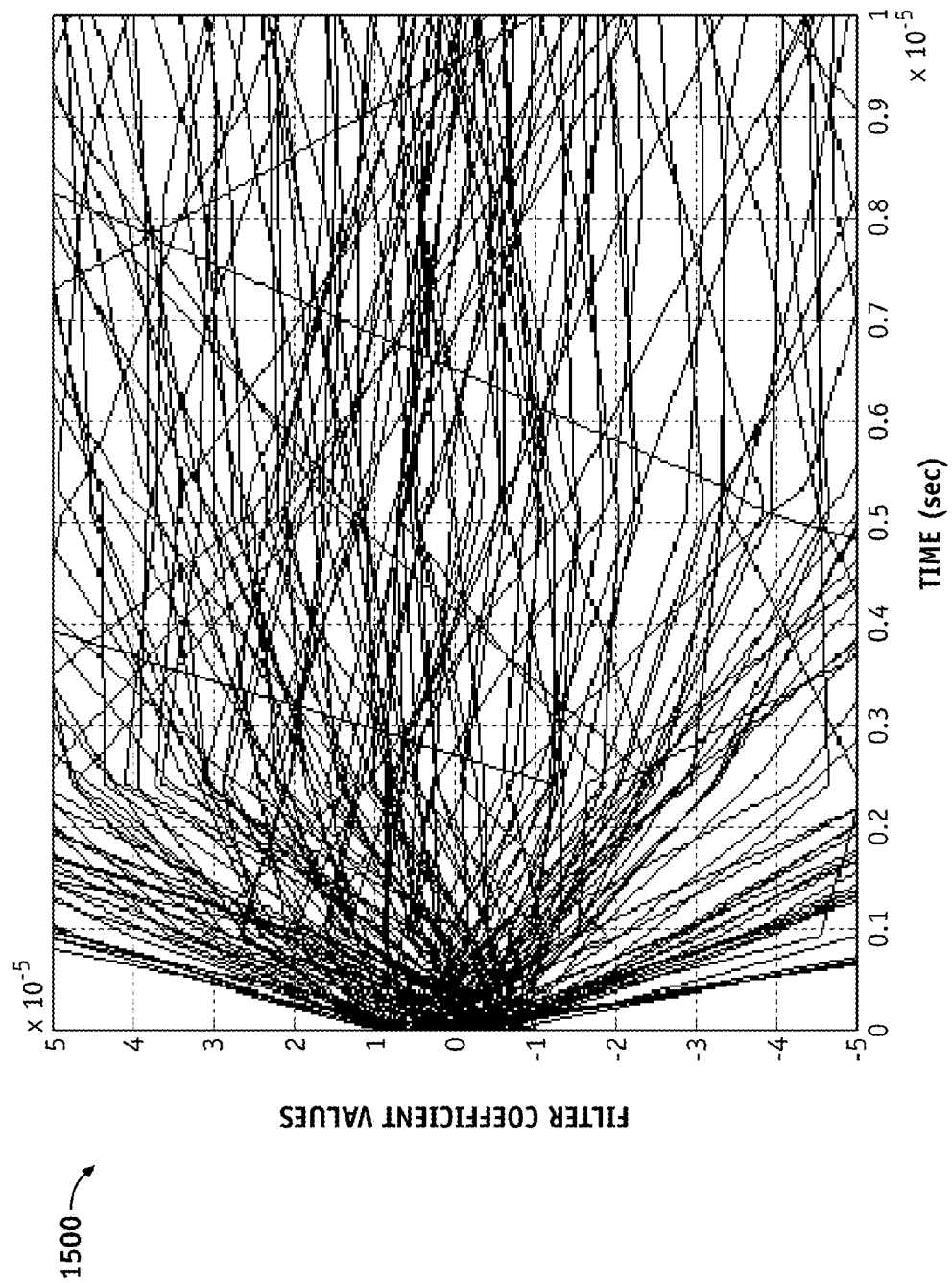
FIG. 15 is an illustration of a graph showing an exemplary filter coefficient convergence using a modified CEM algorithm without background cleaning according to an embodiment of the disclosure.

FIG. 15 is an illustration of a graph 1500 showing an exemplary filter coefficient convergence using the modified OEM algorithm without background cleaning according to an embodiment of the disclosure. As shown in FIG. 15, the filter coefficients w converge slowly.

Figure 16:
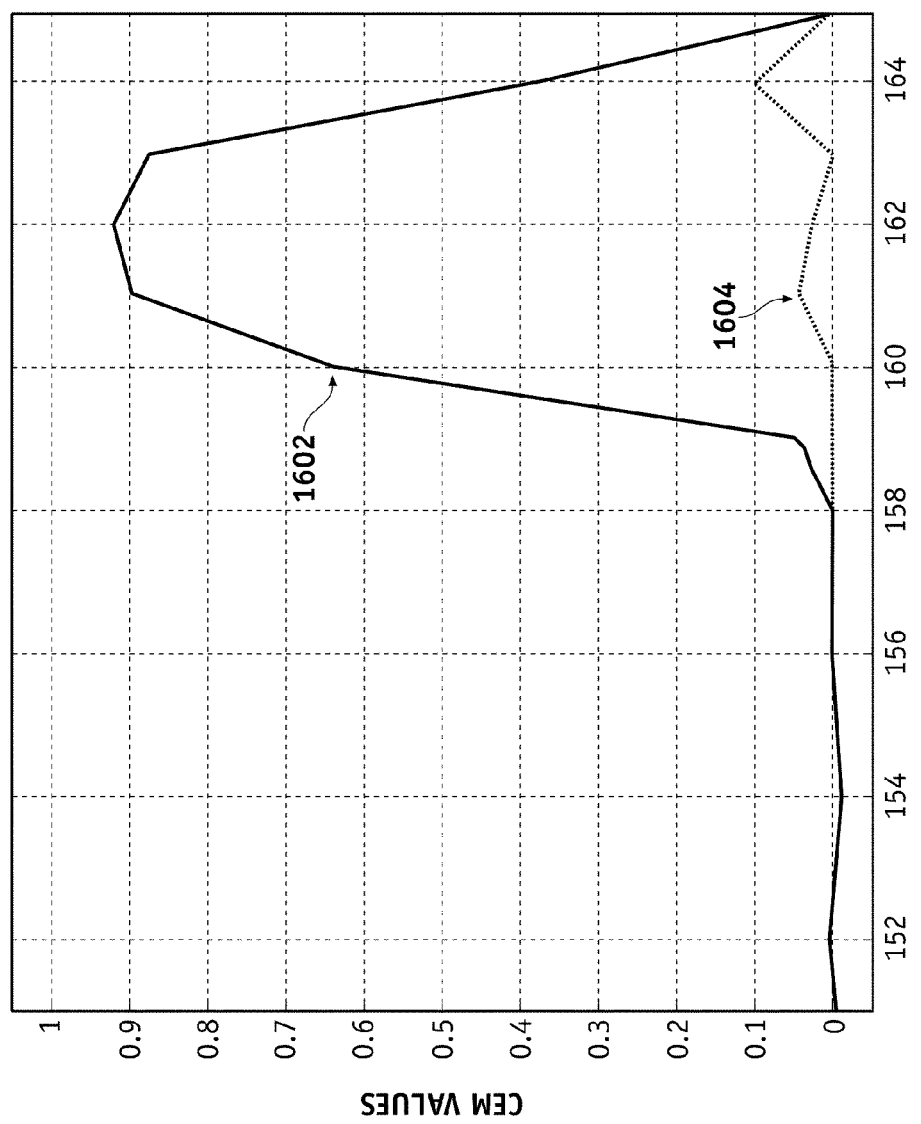
FIG. 16 is an illustration of a graph showing exemplary CEM values estimated using a modified CEM algorithm without background cleaning according to an embodiment of the disclosure compared to a ground truth reference.

FIG. 16 is an illustration of a graph 1600 showing exemplary OEM values estimated using the modified OEM algorithm without background cleaning according to an embodiment of the disclosure compared to ground truth reference. As shown in FIG. 16, the OEM values 1604 estimated by the modified OEM algorithm differ significantly with the ground truth reference 1602 due to presence of a corrupted background.

Figure 17:
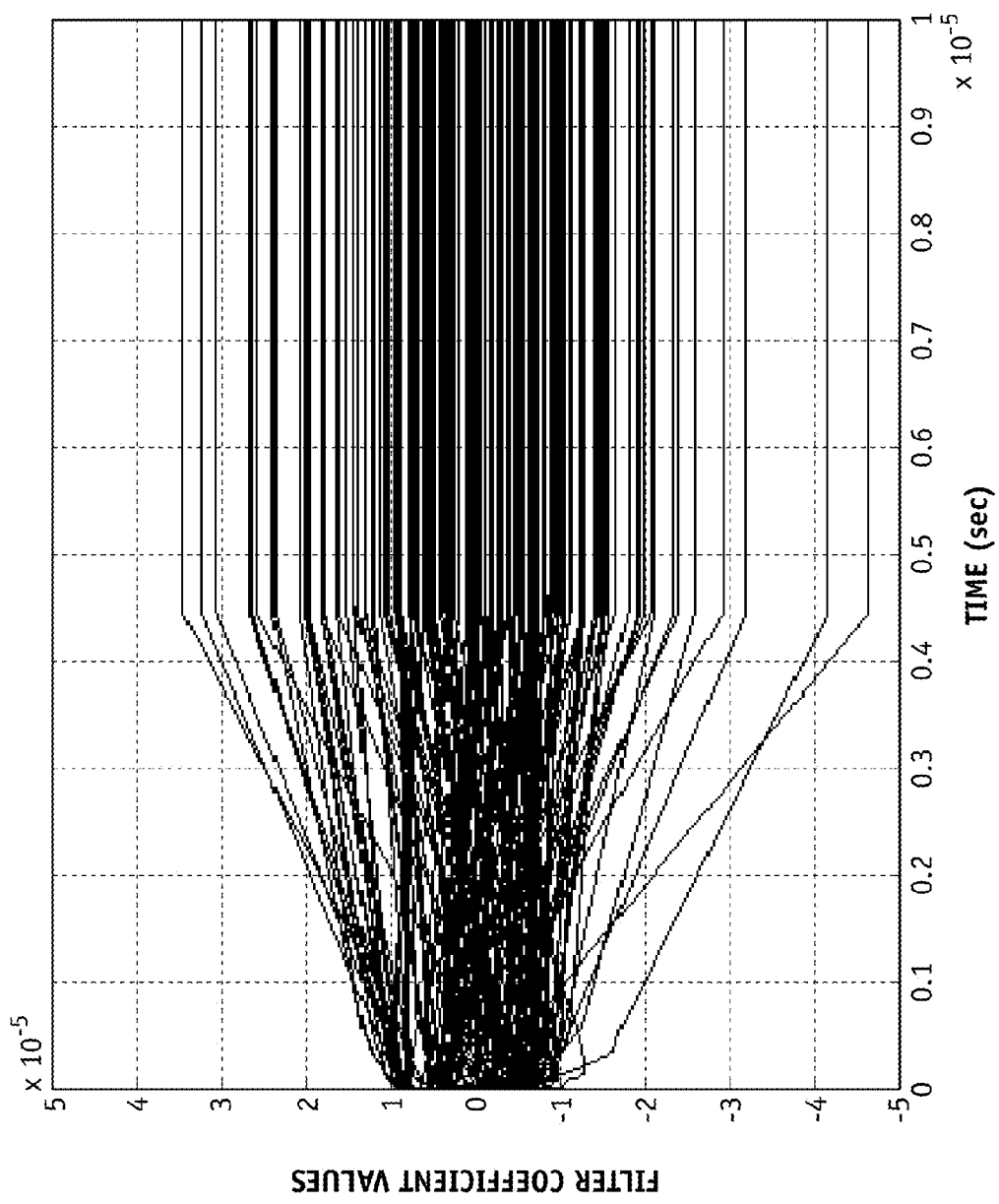
FIG. 17 is an illustration of a graph showing an exemplary filter coefficient convergence using a modified CEM algorithm with background cleaning according to an embodiment of the disclosure.

FIG. 17 is an illustration of a graph 1700 showing an exemplary filter coefficient convergence using the modified OEM algorithm with background cleaning according to an embodiment of the disclosure. As shown in FIG. 17, the filter coefficients w converge relatively quickly and efficiently.

Figure 18:
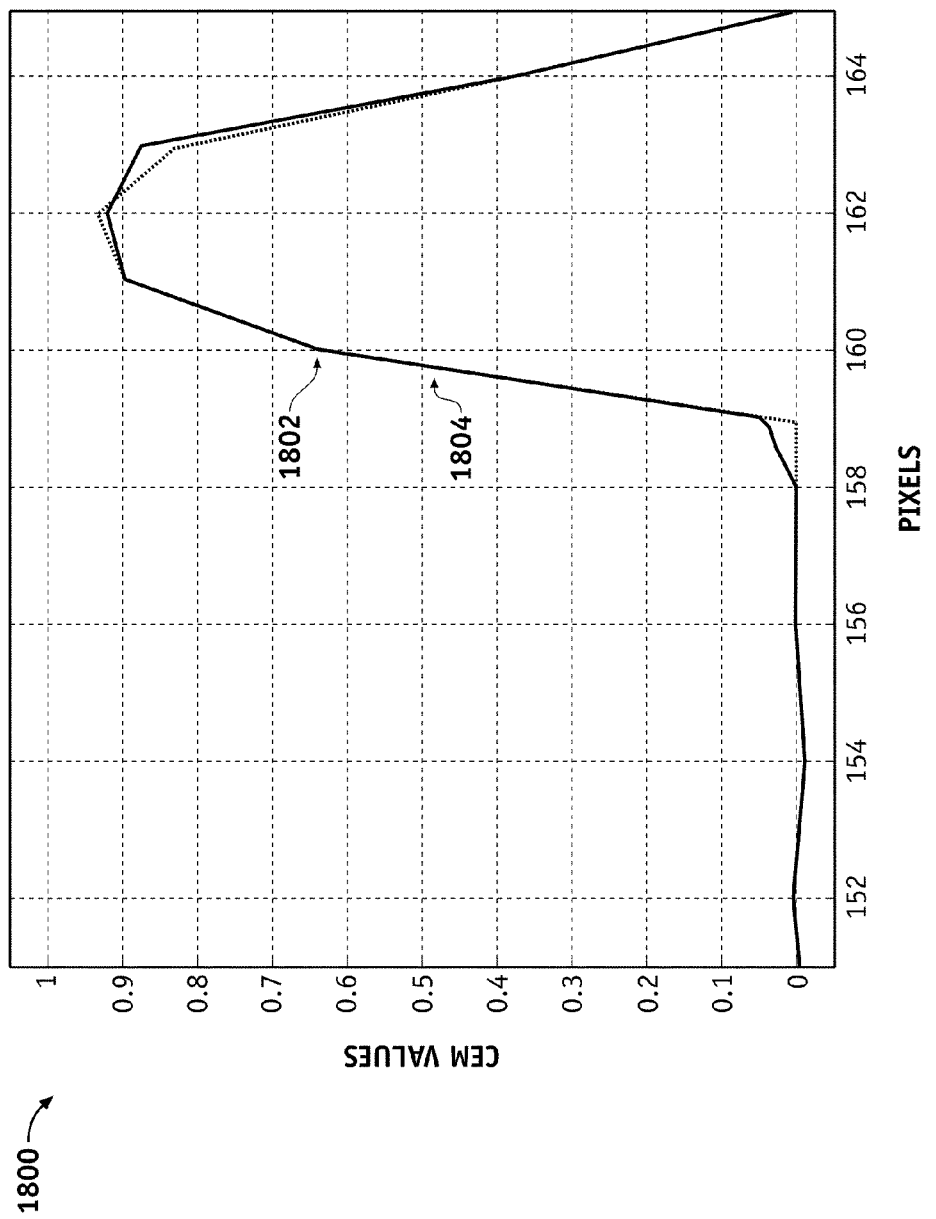
FIG. 18 is an illustration of a graph showing exemplary CEM values estimated using a modified CEM algorithm with background cleaning according to an embodiment of the disclosure compared to a ground truth reference.

FIG. 18 is an illustration of a graph 1800 showing exemplary OEM values estimated using the modified OEM algorithm with the background cleaning according to an embodiment of the disclosure. As shown in FIG. 18, the OEM values 1804 estimated by the modified OEM algorithm are significantly the same as the ground truth reference 1802 due to removal of pixels that are similar to the pixels in the target material when computing statistics of the estimated background spectra $\bar{x}$ and OEM filter coefficient w.

In this way, a simple, high resolution, yet low-power implementation algorithms for a real-time or near real-time hyper-spectral imaging and target detection technique is provide using a continuous-time, discrete-amplitude, analog and digital signal-processing circuit and methods.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 and 7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of target detection from hyper-spectral image data comprising a plurality of pixels comprising target spectra of target material and background spectra of background material, the method comprising:

determining first filter coefficients using circuit means performing constrained linear programming optimization based on the hyper-spectral image data, the target spectra, and an estimated background spectra;

applying a filter comprising the first filter coefficients to the hyper-spectral image data to obtain first filtered pixels;

identifying first target pixels from the first filtered pixels; and estimating the estimated background spectra based on the following relationship:

$$\bar{x} = \frac{1}{p}\sum_{i=0}^{P} x_i$$

where p is a total number of non-excluded pixels, $x_i$ is a vector comprising spectra of an $i^{th}$ non-excluded pixel, and $\bar{x}$ is a vector comprising an averaged spectra of the non-excluded pixels.

2. The method according to claim 1, further comprising identifying a target from the first target pixels.

3. A method of target detection from hyper-spectral image data comprising a plurality of pixels comprising target spectra of target material and background spectra of background material, the method comprising:

determining first filter coefficients using circuit means performing constrained linear programming optimization based on the hyper-spectral image data, the target spectra, and an estimated background spectra, wherein the circuit means comprises a modified CEM algorithm based on the following relationship:

$$\min(w^T x), \bar{x} = \frac{1}{p}\sum_{i=0}^{p} x_i \text{ and } \begin{cases} w^T * t = 1 \\ w^T * x_i \geq 0 \ i = 1, \ldots, p \end{cases}$$

where p is a total number of pixels, $x_i$ is a vector comprising spectra of an $i^{th}$ pixel, $\bar{x}$ is a vector comprising an averaged spectra of non-excluded pixels, w is a OEM filter coefficients vector, T denotes vector transposition, and t is a vector comprising the target spectra;
applying a filter comprising the first filter coefficients to the hyper-spectral image data to obtain first filtered pixels; and
identifying first target pixels from the first filtered pixels.

4. The method according to claim 1, further comprising identifying one or more of the first filtered pixels as one or more of the first target pixels, if a constrained energy minimization (CEM) value of the one or more of the first filtered pixels is greater than a CEM threshold.

5. The method according to claim 1, wherein the circuit means performs the constrained linear programming optimization in real time.

6. The method according to claim 1, wherein the circuit means comprises a modified CEM algorithm.

7. The method according to claim 6, wherein the modified CEM algorithm is based on the following relationship:

$$\min(w^T \bar{x}), \bar{x} = \frac{1}{p}\sum_{i=0}^{p} x_i \text{ and } \begin{cases} w^T * t = 1 \\ w^T * x_i \geq 0 \ i = 1, \ldots, p \end{cases}$$

where p is a total number of pixels, $x_i$ is a vector comprising spectra of an $i^{th}$ pixel, $\bar{x}$ is a vector comprising an averaged spectra of non-excluded pixels, w is a CEM filter coefficients vector, T denotes vector transposition, and t is a vector comprising the target spectra.

8. The method according to claim 7, wherein $w^T * x_i$ is allowed to be less than zero for at least one $x_i$.

9. The method according to claim 1, further comprising:
determining second filter coefficients using the circuit means to perform the constrained linear programming optimization based on the hyper-spectral image data, the target spectra, and the estimated background spectra, wherein the estimated background spectra is calculated from the hyper-spectral image data excluding the first target pixels;
applying a second filter comprising the second filter coefficients to the hyper-spectral image data to obtain second filtered pixels; and
identifying second target pixels from the second filtered pixels.

10. The method according to claim 9, further comprising excluding the first target pixels based on a CEM value.

11. The method according to claim 9, further comprising identifying a target from the second target pixels.

12. The method according to claim 1, further comprising using the target detection for one of the group consisting of: remote sensing, collision avoidance, image analysis, and scanning of a body.

13. A method of target detection from hyper-spectral image data, the method comprising:
identifying a plurality of pixels using a signal processor, each pixel comprising target spectra of target material and background spectra of background material;
calculating an average of spectra of the pixels using the signal processor to obtain a first background spectra;
performing a constrained linear programming optimization based on the hyper-spectral image data, the target spectra, and the first background spectra to obtain first filter coefficients using the signal processor, the constrained linear programming optimization optimization based on the following relationship:

$$\min(w^T \bar{x}), \bar{x} = \frac{1}{p}\sum_{i=0}^{p} x_i \text{ and } \begin{cases} w^T * t = 1 \\ w^T * x_i \geq 0 \ i = 1, \ldots, p \end{cases}$$

where p is a total number of pixels, $x_i$ is a vector comprising spectra of an $i^{th}$ pixel, $\bar{x}$ is a vector comprising an averaged spectra of non-excluded pixels, w is a OEM filter coefficients vector, T denotes vector transposition, and t is a vector comprising spectra of the target material; and
estimating a constrained energy minimization (OEM) value for the pixels using the first filter coefficients using the signal processor.

14. A method of target detection from hyper-spectral image data, the method comprising:
identifying a plurality of pixels using a signal processor, each pixel comprising target spectra of target material and background spectra of background material;
calculating an average of spectra of the pixels using the signal processor to obtain a first background spectra, the first background spectra calculated based on the following relationship:

$$\bar{x} = \frac{1}{p}\sum_{i=0}^{p} x_i$$

where p is a total number of non-excluded pixels, $x_i$ is a vector comprising spectra of an $i^{th}$ non-excluded pixel, and $\bar{x}$ is a vector comprising an averaged spectra of the non-excluded pixels;
performing a constrained linear programming optimization based on the hyper-spectral image data, the target spectra, and the first background spectra to obtain first filter coefficients using the signal processor; and
estimating a constrained energy minimization (OEM) value for the pixels using the first filter coefficients using the signal processor.

15. The method according to claim 14, further comprising identifying pixels comprising the target material using the CEM value to obtain target pixels.

16. The method according to claim 15, further comprising:
removing the target pixels from the pixels to obtain non-target pixels;
calculating an average of spectra of the non-target pixels to obtain a second background spectra;
performing the CEM optimization based on the hyper-spectral image data, the target spectra, and the second background spectra to obtain second filter coefficients; and calculating CEM values of the pixels using the second filter coefficients.

17. The method according to claim 16, wherein the second background spectra is calculated based on the following relationship:

$$\bar{x} = \frac{1}{p}\sum_{i=0}^{p} x_i$$

where p is a total number of non-excluded pixels, $x_i$ is a vector comprising spectra of an $i^{th}$ non-excluded pixel, $\bar{x}$ is a vector comprising an averaged spectra of the non-excluded pixels.

18. The method according to claim 14, further comprising detecting a target for one of the group consisting of: remote sensing, avoiding a collision, analyzing an image, and scanning of a body.

19. The method according to claim 14, wherein the constrained linear programming optimization is based on the following relationship:

$$\min(w^T\bar{x}), \bar{x} = \frac{1}{p}\sum_{i=0}^{p} x_i \text{ and } \begin{cases} w^T * t = 1 \\ w^T * x_i \geq 0 \ i = 1, \ldots, p \end{cases}$$

where p is a total number of pixels, $x_i$ is a vector comprising spectra of an $i^{th}$ pixel, $\bar{x}$ is a vector comprising an averaged spectra of non-excluded pixels, w is a CEM filter coefficients vector, T denotes vector transposition, and t is a vector comprising spectra of the target material.

20. The method according to claim 19, wherein $w^T * x_i$ is allowed to be less than zero for at least one $x_i$.

21. A circuit for hyper-spectral target detection, the circuit comprising:
control means that selects target pixels from hyper-spectral image data, and calculates the estimated background spectra based on the following relationship:

$$\bar{x} = \frac{1}{p}\sum_{i=0}^{p} x_i$$

where p is a total number of non-excluded pixels, $x_i$ is a vector comprising spectra of an $i^{th}$ non-excluded pixel, and $\bar{x}$ is a vector comprising an averaged spectra of the non-excluded pixels;
filter means that compares a target spectra to the hyper-spectral image data; and
constrained linear programming optimization means that calculates filter coefficients from the hyper-spectral image data, the target spectra, and an estimated background spectra.

22. The circuit according to claim 21, further comprising receiving near real-time hyper-spectral image data.

23. The circuit according to claim 21, wherein:
the constrained linear programming optimization means further determines first filter coefficients using constrained linear programming optimization based on the hyper-spectral image data, the target spectra, and the estimated background spectra;
the filter means further applies the first filter coefficients to the hyper-spectral image data to obtain first filtered pixels; and
the control means further identifies first target pixels from the first filtered pixels.

24. The circuit according to claim 23, wherein the control means further identifies a target from the first target pixels.

25. The circuit according to claim 23, wherein one or more first filtered pixels is identified as one or more first target pixels, if a constrained energy minimization (CEM) value of the one or more first filtered pixels is greater than a CEM threshold.

26. The circuit according to claim 25, wherein the CEM value is estimated using the first filter coefficients.

27. The circuit according to claim 21, wherein the circuit is for one of the group consisting of: detecting a target for remote sensing, collision avoidance, image analysis, and scanning of a body.

28. The circuit according to claim 21, wherein:
the constrained linear programming optimization means further determines second filter coefficients using constrained linear programming optimization based on the hyper-spectral image data, the target spectra, and the estimated background spectra, wherein the estimated background spectra is calculated from the hyper-spectral image data excluding the first target pixels;
the filter means further applies a filter comprising the second filter coefficients to the hyper-spectral image data to obtain second filtered pixels; and
the control means further identifies second target pixels from the second filtered pixels.

29. The circuit according to claim 28, wherein the control means further identifies a target from the second target pixels.

30. The circuit according to claim 28, wherein one or more second filtered pixels is identified as one or more second target pixels, if a CEM value of the one or more second filtered pixels is greater than a CEM threshold.

31. The circuit according to claim 28, wherein the CEM value is estimated using the first filter coefficients.

32. The circuit according to claim 21, wherein the constrained linear programming optimization is based on the following relationship:

$$\min(w^T\bar{x}), \bar{x} = \frac{1}{p}\sum_{i=0}^{p} x_i \text{ and } \begin{cases} w^T * t = 1 \\ w^T * x_i \geq 0 \ i = 1, \ldots, p \end{cases}$$

where p is a total number of pixels, $x_i$ is a vector comprising spectra of an $i^{th}$ pixel, $\bar{x}$ is a vector comprising an averaged spectra of non-excluded pixels, w is a CEM filter coefficients vector, T denotes vector transposition, and t is a vector comprising spectra of the target material.

33. The circuit according to claim 32, wherein $w^T * x_i$ is allowed to be less than zero for at least one $x_i$.

34. The circuit according to claim 21, wherein the constrained linear programming optimization means further performs calculations in real time.

* * * * *